United States Patent
Rai et al.

(10) Patent No.: US 12,518,134 B2
(45) Date of Patent: Jan. 6, 2026

(54) GENERATING DIGITAL ASSETS UTILIZING A CONTENT AWARE MACHINE-LEARNING MODEL

(71) Applicant: Adobe Inc., San Jose, CA (US)

(72) Inventors: Nishant Rai, Azamgarh (IN); Shivam Mishra, Kanpur (IN); Nitesh Jain, Noida (IN); Nikhil Gupta, Noida (IN); Anubhav Jain, Faridabad (IN)

(73) Assignee: Adobe Inc., San Jose, CA (US)

( * ) Notice: Subject to any disclaimer, the term of this patent is extended or adjusted under 35 U.S.C. 154(b) by 1107 days.

(21) Appl. No.: 17/512,264

(22) Filed: Oct. 27, 2021

(65) Prior Publication Data
US 2023/0127525 A1    Apr. 27, 2023

(51) Int. Cl.
*G06N 3/045*    (2023.01)
*G06V 10/56*    (2022.01)
*G06V 10/74*    (2022.01)
*G06V 10/82*    (2022.01)

(52) U.S. Cl.
CPC ........... *G06N 3/045* (2023.01); *G06V 10/56* (2022.01); *G06V 10/74* (2022.01); *G06V 10/82* (2022.01)

(58) Field of Classification Search
CPC ........ G06N 3/045; G06N 3/0464; G06N 3/08; G06V 10/56; G06V 10/74; G06V 10/82
See application file for complete search history.

(56) References Cited

U.S. PATENT DOCUMENTS

| | | | |
|---|---|---|---|
| 8,913,827 B1 * | 12/2014 | Fang | G06F 18/22 382/167 |
| 9,418,316 B1 * | 8/2016 | Liu | G06V 20/63 |
| 9,576,210 B1 * | 2/2017 | Liu | G06T 7/0002 |

(Continued)

FOREIGN PATENT DOCUMENTS

DE    102023131072 A1 *    5/2024    ............... G06N 3/08

OTHER PUBLICATIONS

Ali Jahanian et al.,( NPL Doc:"Colors—Messengers of Concepts: Visual Design Mining for Learning Color Semantics," Jan. 2017, ACM Transactions on Computer-Human Interaction, vol. 24, No. 1, Article 2,pp. 2:1-2: 15 ,2:23-2:30).*

(Continued)

*Primary Examiner* — Omar S Ismail
(74) *Attorney, Agent, or Firm* — Keller Preece PLLC

(57) ABSTRACT

The present disclosure describes methods, systems, and non-transitory computer-readable media for implementing a machine learning framework to generate a recommend digital assets from a digital image. For example, in one or more embodiments, the disclosed systems utilize a machine learning model to detect a shape, color, pattern, or other digital asset type from a digital image and then extract (and further modify) the detected asset type to create various different digital assets as recommendations. In some cases, the disclosed system utilizes the machine learning model to determine one or more digital asset classes associated with the digital image, generate preprocessed digital assets from the digital image for those digital asset classes, and generate production-ready digital assets from the preprocessed digital assets. Further, in some instances, the disclosed systems provide one or more of the digital assets via recommendations based on asset scores determined via the generation process.

20 Claims, 13 Drawing Sheets

(56) References Cited

U.S. PATENT DOCUMENTS

| | | | | |
|---|---|---|---|---|
| 10,176,405 | B1* | 1/2019 | Zhou | H04N 7/181 |
| 10,515,275 | B2* | 12/2019 | Lu | G06F 16/56 |
| 11,587,234 | B2* | 2/2023 | Zhao | G06T 7/11 |
| 11,676,279 | B2* | 6/2023 | Price | G06N 3/088 |
| | | | | 382/156 |
| 11,803,971 | B2* | 10/2023 | Hwang | G06V 10/762 |
| 11,902,522 | B2* | 2/2024 | Gao | G06V 10/26 |
| 2015/0220806 | A1* | 8/2015 | Heller | G06F 16/5866 |
| | | | | 382/159 |
| 2015/0339525 | A1* | 11/2015 | Marcelli | G06V 30/226 |
| | | | | 382/161 |
| 2017/0278289 | A1* | 9/2017 | Marino | G06T 7/536 |
| 2017/0372117 | A1* | 12/2017 | Bredno | G06V 20/698 |
| 2018/0046649 | A1* | 2/2018 | Dal Mutto | G06F 16/56 |
| 2018/0228426 | A1* | 8/2018 | Sinai | G06F 18/24 |
| 2018/0336399 | A1* | 11/2018 | Gernoth | G06F 3/012 |
| 2019/0340462 | A1* | 11/2019 | Pao | G06V 10/82 |
| 2020/0159871 | A1* | 5/2020 | Bowen | G06T 11/60 |
| 2020/0160612 | A1* | 5/2020 | Bowen | G06F 30/20 |
| 2020/0225673 | A1* | 7/2020 | Ebrahimi Afrouzi | |
| | | | | A47L 11/4011 |
| 2020/0250395 | A1* | 8/2020 | Ross | G06V 10/772 |
| 2020/0258223 | A1* | 8/2020 | Yip | G06F 18/21 |
| 2020/0279008 | A1* | 9/2020 | Jain | G06F 16/954 |
| 2020/0321102 | A1* | 10/2020 | Barnes | G16H 20/10 |
| 2021/0124993 | A1* | 4/2021 | Singh | G06F 18/2451 |
| 2021/0133477 | A1 | 5/2021 | Dhanuka et al. | |
| 2021/0166380 | A1* | 6/2021 | Yip | G06V 20/698 |
| 2021/0166381 | A1* | 6/2021 | Yip | G06T 7/37 |
| 2022/0237789 | A1* | 7/2022 | Nie | G06F 18/2414 |
| 2022/0375602 | A1* | 11/2022 | Jaber | G16H 30/40 |
| 2022/0391633 | A1* | 12/2022 | Harikumar | G06V 10/82 |

OTHER PUBLICATIONS

Xuyong Yang et al.,"Automatic Generation of Visual-Textual Presentation Layout," Feb. 2016,ACM Trans. Multimedia Comput. Commun. Appl., vol. 12, No. 2, Article 33, Publication date: Feb. 2016,pp. 33:1-33:21.*

Quentin Poterek et al.,"Deep Learning for Automatic Colorization of Legacy Grayscale Aerial Photographs," Jun. 16, 2020, IEEE Journal of Selected Topics in Applied Earth Observations and Remote Sensing, vol. 13, 2020,pp. 2899-2910.*

Yan Zhang et al.,"Deep neural network for half tone image classification based on sparse auto-encoder," Feb. 15, 2016, Engineering ApplicationsofArtificial Intelligence(2016), p. 245-252.*

Shervin Minaee et al.,"Image Segmentation Using Deep Learning: A Survey," Jun. 3, 2022, IEEE Transactions on Pattern Analysis and Machine Intelligence, vol. 44, No. 7, Jul. 2022,pp. 3523-3533.*

Sugata Banerji et al.,"New image descriptors based on color, texture,shape, and wavelets for object and scene image classification," Feb. 27, 2013,eurocomputing 117(2013),pp. 173-181.*

Chung-Feng Jeffrey Kuo et al.,"Application of computer vision in the automatic identification and classification of woven fabric weave patterns," Aug. 20, 2010,Physical Sciences,vol. 80, Issue 20, pp. 2144-2155.*

Zhaojin Huang et al.,"Mask Scoring R-CNN," Jun. 2019,Proceedings of the IEEE/CVF Conference on Computer Vision and Pattern Recognition (CVPR), 2019,p. 6409-6414.*

Sandler, Mark et al. MobileNetV2: Inverted Residuals and Linear Bottlenecks; arXiv:1801.04381v4 [cs.CV] Mar. 21, 2019; https://arxiv.org/pdf/1801.04381.pdf.

Google AI Blog; "MobileNetV2: The Next Generation of On-Device Computer Vision Networks"; posted by Mark Sandler and Andrew Howard, Google Research; Apr. 3, 2018; https://ai.googleblog.com/2018/04/mobilenetv2-next-generation-of-on.html.

Google AI Blog; "MobileNets: Open-Source Models for Efficient On-Device Vision"; Posted by Andrew G. Howard and Menglong Zhu; Jun. 14, 2017.

ML Kit; "Detect and track objects with ML Kit on Android" Date downloaded Nov. 15, 2021; https://developers.google.com/ml-kit/vision/object-detection/android.

ML Kit; "Recognize text in images with ML Kit on Android" Date downloaded Nov. 15, 2021; https://developers.google.com/ml-kit/vision/text-recognition/android.

Android Developers; "Selecting Colors with the Palette API"; Date downloaded Nov. 15, 2021; https://developer.android.com/training/material/palette-colors.

Heramb Devbhankar; Towards Data Science; "Instance Segmentation with Mask R-CNN: A brief guide to using Mask R-CNN trained on MS COCO dataset"; May 16, 2020; https://towardsdatascience.com/instance-segmentation-with-mask-r-cnn-6e5c4132030b.

Huang, Zhaojin et al.; "Mask Scoring R-CNN"; arXiv:1903.00241v1 [cs.CV] Mar. 1, 2019; https://arxiv.org/pdf/1903.00241.pdf.

Derrick Mwiti, Katherine (Yi) Li; Neptuneblog; "Image Segmentation in 2021: Architectures, Losses, Datasets, and Frameworks"; Date downloaded Nov. 15, 2021; https://neptune.ai/blog/image-segmentation-in-2020.

Ren, Shaoqing et al.; "Faster R-CNN: Towards Real-Time Object Detection with Region Proposal Networks"; arXiv:1506.01497v3 [cs.CV] Jan. 6, 2016.

Feng, Vincent; Towards Data Science; "An Overview of ResNet and its Variants"; Jul. 15, 2017.

Odemakinde, Elisha; viso.ai; "Mask R-CNN: A Beginner's Guide"; Mar. 19, 2021.

Monteras, Jobert; Pond5 Blog; Creating Color Themes and Looks with Adobe Capture CC; Oct. 11, 2016.

Renno, Eric; photofocus; "Creating Patterns with Adobe Capture"; Date downloaded Nov. 15, 2021. https://photofocus.com/mobile/mobile-apps/creating-patterns-with-adobe-capture/.

Adobe.com; "Capture shapes for Photoshop"; Date downloaded Nov. 15, 2021. https://helpx.adobe.com/mobile-apps/how-to/capture-shapes-photoshop.html.

Karr, Douglas; Martech Zone; "How to Find Fonts with Adobe Capture"; May 5, 2020; https://martech.zone/how-to-find-fonts-adobe-capture/.

Medium.com; Hui, Jonathan; "What do we learn from region based object detectors (Faster R-CNN, R-FCN, FPN)?"; Mar. 28, 2018; https://jonathan-hui.medium.com/what-do-we-learn-from-region-based-object-detectors-faster-r-cnn-r-fcn-fpn-7e354377a7c9.

* cited by examiner

800

Determining A Digital Asset Class Associated With A Digital Image 802

Generating A Digital Asset Corresponding To The Digital Asset Class 804

Generating A Recommended Digital Asset From The Digital Asset 806

GENERATING DIGITAL ASSETS UTILIZING A CONTENT AWARE MACHINE-LEARNING MODEL

BACKGROUND

In recent years, computer-implemented technologies have improved software platforms for generating digital visual content. For instance, many conventional digital asset generation systems can create original digital visual content by incorporating one or more visual elements known as digital assets (e.g., objects, colors, fonts). Some conventional digital asset generation systems provide tools whereby user devices can create the digital assets themselves. Indeed, such conventional systems can provide software tools that facilitate the creation of digital assets from the ground up or using some template. To illustrate, some conventional systems provide tools for generating one or more digital assets from a digital image that depicts or is otherwise associated with the digital asset(s). For instance, some conventional digital asset generation systems can extract an object from a digital image and provide the object within a template from which a user device can edit and add other imagery to create a pattern or other digital asset. Although conventional systems can provide tools for digital asset generation, as explained further below, they typically rely on difficult and tedious interactive procedures and require use of multiple separate graphical user interfaces and computational models to generate different digital assets, resulting in inefficient operation.

SUMMARY

This disclosure describes one or more embodiments of methods, non-transitory computer-readable media, and systems that solve one or more of the foregoing problems and provide other benefits. For example, in one or more embodiments, the disclosed systems utilize a machine learning model to detect a shape, color, pattern, or other digital asset type from a digital image and then extract (and further modify) the detected asset type to create various different digital assets as recommendations. To illustrate, in some implementations, the disclosed systems implement a machine learning model to determine an asset type that is associated with a digital image from various asset types. The disclosed systems also utilize the machine learning model to generate, from the digital image, a digital asset of the asset type and provide the digital asset to a client device as part of an asset recommendation. The asset recommendation may include or incorporate various different types, including a shape, color palette, color gradient, pattern, font, or others noted below.

In some cases, the disclosed systems utilize the machine learning model to generate multiple digital assets of different asset types from the digital image, score the digital assets via the generation process, rank the digital assets based on their scores, and utilize the ranking to select one or more of the digital assets for recommendation to a client device. Thus, the disclosed systems introduce an unconventional approach that utilizes machine learning to efficiently generate digital assets from digital images. Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
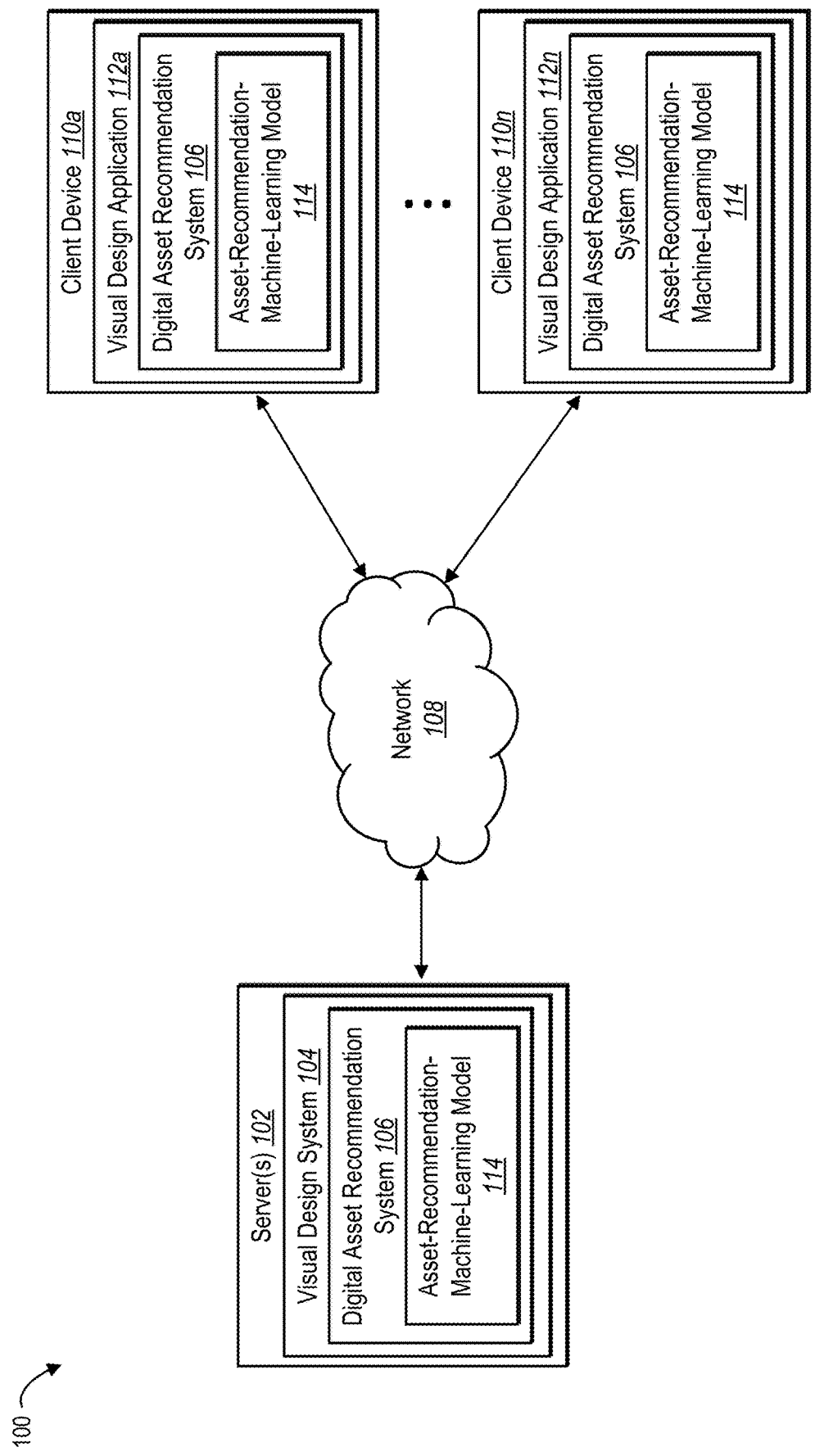
FIG. 1 illustrates an example system environment in which a digital asset recommendation system can operate in accordance with one or more embodiments.

The disclosure describes one or more embodiments of a digital asset recommendation system that utilizes a machine learning model to detect, generate, and recommend different types of digital assets from a digital image. In one or more embodiments, the machine learning model implements one or more subunits, such as a classifier for determining asset types associated with a digital image, one or more specialized assets networks for identifying interest areas of the digital image and generating pre-assets (e.g., pre-configured digital assets), and one or more additional classifiers for determining configurations to generate digital assets. In some cases, the machine learning model further includes an intelligent ranking unit (IRU) that ranks the digital assets based on scores determined throughout the generation process and selects one or more of the digital assets for recommending to a client device based on the ranking. Thus, in one or more embodiments, the digital asset recommendation system utilizes the machine learning model for end-to-end creation and recommendation of production-ready digital assets based on analysis of a digital image.

To provide an illustration, in one or more embodiments, the digital asset recommendation system determines, utilizing an asset-recommendation-machine-learning model, a digital asset class associated with a digital image from among a set of different digital asset classes. Additionally, the digital asset recommendation system generates, from the digital image and utilizing the asset-recommendation-machine-learning model, a digital asset corresponding to the digital asset class. The digital asset recommendation system further generates, from the digital asset, a recommended digital asset associated with the digital asset class.

As just mentioned, in one or more embodiments, the digital asset recommendation system identifies, generates, and recommends one or more digital assets from a digital image. In some cases, the generated digital assets are associated with one or more digital asset classes (e.g., digital asset types). To illustrate, in some embodiments, the digital asset recommendation system generates, from the digital image, a shape asset corresponding to a shape asset class, a color palette asset corresponding to a color asset class, a color gradient asset corresponding to the color asset class, a pattern asset corresponding to a pattern asset class, a font asset corresponding to a font asset class, or a font theme asset corresponding to the font asset class.

As further mentioned above, in some embodiments, the asset-recommendation-machine-learning model includes various different networks or models for identifying, generating, and selecting digital assets for recommendation to a client device. For instance, in one or one embodiments, the digital asset recommendation system utilizes an asset-classification-neural network of the asset-recommendation-machine-learning model to determine one or more digital asset classes associated with the digital image. In some embodiments, the asset-classification-neural network generates a classification metric for each of a plurality of digital asset classes—such as the shape asset class, the pattern asset class, and the color asset class—to indicate a likelihood that the digital image is associated with the digital asset class (e.g., the digital image is usable for generating a digital asset from that digital asset class). In some cases, the digital asset recommendation system utilizes a separate font classification model of the asset-recommendation-machine-learning model to generate a classification metric for the font asset class. In some implementations, the digital asset recommendation system determines that a digital asset class is associated with the digital image based on the classification metric for the digital asset class satisfying a threshold value.

In addition to an asset-classification-neural network, in one or more embodiments, the digital asset recommendation system utilizes one or more pre-asset networks of the asset-recommendation-machine-learning model to generate one or more preprocessed digital assets for the digital asset classes associated with the digital image. For instance, in some embodiments, the digital asset recommendation system utilizes the one or more pre-asset networks to generate a preprocessed shape asset corresponding to the shape asset class or the pattern asset class by identifying and extracting an object portrayed in the digital image. In some cases, the digital asset recommendation system utilizes the one or more pre-asset networks to generate a preprocessed color asset corresponding to the color class by generating a foreground image layer and/or a background image layer from the digital image. In some instances, the digital asset recommendation system further utilizes the one or more pre-asset networks to generate a font asset corresponding to the font class based the height and/or length of text depicted in the digital image.

In addition to an asset-classification-neural network and one or more pre-asset networks, in one or more embodiments, the digital asset recommendation system further utilizes one or more asset-configuration-neural networks of the asset-recommendation-machine-learning model to generate digital assets from the preprocessed digital assets. For instance, in some cases, the digital asset recommendation system utilizes an asset-configuration-neural network to generate a shape asset or a pattern asset from a preprocessed shape asset. In some implementations, the digital asset recommendation system utilizes an asset-configuration-neural network to generate a color palette asset or a color gradient asset from a preprocessed color asset.

In addition to utilizing various internal networks noted above, in some embodiments, the digital asset recommendation system utilizes the asset-recommendation-machine-learning model to determine one or more recommended digital assets from the generated digital assets. To illustrate, in some cases, the asset-recommendation-machine-learning model determines an asset score for each of the generated digital assets and ranks the digital assets based on their asset scores. Further, the asset-recommendation-machine-learning model selects one or more digital assets to provide as recommendations to a client device using the ranking.

In one or more embodiments, the digital asset recommendation system provides the recommendations that include the selected digital assets for display within a graphical user interface of the client device that also displays a digital asset created by the client device from the digital image. Indeed, in some cases, the digital asset recommendation system detects one or more user interactions with the graphical user interface for creating a digital asset from a digital image. Accordingly, the digital asset recommendation system implements the asset-recommendation-machine-learning model to identify, generate, and recommend one or more additional digital assets and provides the recommendation(s) for display within the graphical user interface.

In some cases, the digital asset recommendation system implements the asset-recommendation-machine-learning model to provide various other features. As one example, upon identifying a digital asset class associated with a digital image via the asset-recommendation-machine-learning model, the digital asset recommendation system provides, to a client device, one or more interactive elements for generating a digital asset of the digital asset class from the digital image. Accordingly, the digital asset recommendation system utilizes the asset-recommendation-machine-learning model to facilitate device-interactive creation of a digital asset via the client device.

As mentioned above, conventional digital asset generation systems suffer from technological shortcomings that result in inefficient operation. In particular, conventional digital asset generation systems typically rely on labor-intensive interactive procedures for generating a digital asset from a digital image. Such procedures often require multiple steps of users interacting with a graphical user interface to identify, create, edit, and save digital assets for subsequent use. Some conventional systems require separate graphical user interfaces for each step in the process (e.g., a graphical user interface for identifying a digital asset, one or more graphical user interfaces for creating the digital asset). Thus, these conventional systems provide inefficient digital asset generation processes having significant turnaround time and interaction before a digital asset is ready to use.

Further, conventional digital asset generation systems often utilize different computational models for generating digital assets of different types, exacerbating the efficiency problems. Indeed, many conventional systems implement a dedicated set of computational models for identifying and providing tools to create a digital asset of a particular type. Accordingly, these systems typically require a client device to open and execute separate sets of models or applications to create multiple digital assets from a digital image, where some of the digital assets are of a different type or class. Such systems consume a significant amount of computing resources in the opening and execution of these separate models.

The digital asset recommendation system provides several advantages over conventional systems. For example, the digital asset recommendation system provides for improved efficiency by reducing the user interactions required for generating digital assets from digital images. In particular, by implementing an asset-recommendation-machine-learning model to identify, generate, and recommend digital assets, the digital asset recommendation system provides a user interface for preparing and saving production-ready digital assets with reduced user interactions. Indeed, with only a few user interactions, the digital asset recommendation system can generate multiple digital assets from a digital image where conventional systems would typically require many additional user interactions to generate a single digital asset from the same digital image. Further, by implementing the asset-recommendation-machine-learning model, the digital asset recommendation system can generate one or more digital assets from a digital image without requiring navigation through multiple graphical user interfaces, computational models, or applications dedicated to performing a particular task (e.g., identifying a digital asset) or dedicated to a particular asset type (e.g., only font assets). Accordingly, the digital asset recommendation system provides a more efficient digital asset generation process with reduced turnaround time, reduced interaction and navigation, and reduced consumption of computing resources.

Additionally, the digital asset recommendation system provides improved flexibility and functionality when compared to conventional digital asset generation systems by generating recommended digital assets of different digital asset classes. While conventional systems typically implement computational models that are limited to generating a digital asset of a particular digital asset type (e.g., only font assets or only color assets), the digital asset recommendation system flexibly generates digital assets from multiple digital asset classes. For instance, the digital asset recommendation system can (i) generate digital assets of different digital asset classes from different digital images or (ii) generate multiple digital assets from different digital asset classes using a single digital image. The digital asset recommendation system provides such flexibility by implementing various internal networks and models of an asset-recommendation-machine-learning model to intelligently detect the contents of a digital image, determine potential digital asset classes corresponding to the contents, and generate digital assets from those digital asset classes using selected internal networks and models.

Further, the digital asset recommendation system introduces an unconventional approach for creating production-ready digital assets from a digital image. In particular, the digital asset recommendation system utilizes an unconventional ordered combination of actions for identifying, creating, and recommending digital assets from a digital image via a machine learning model. Indeed, the digital asset recommendation system utilizes an asset-recommendation-machine-learning model to determine which types of digital assets can be generated from a digital image, generates one or more digital assets that are of those types of digital assets, and determine recommendable digital assets from the generated digital assets. Thus, the digital asset recommendation system utilizes machine learning to provide a client device with recommendations that include pre-generated digital assets that are production ready. Further, by utilizing the asset-recommendation-machine-learning model to identify and generate digital assets, the digital asset recommendation system provides options for digital assets that may ordinarily by unrecognized by users.

Additional detail regarding the digital asset recommendation system will now be provided with reference to the figures. For example, FIG. 1 illustrates a schematic diagram of an exemplary system 100 in which a digital asset recommendation system 106 operates. As illustrated in FIG. 1, the system 100 includes a server(s) 102, a network 108, and client devices 110a-110n.

Although the system 100 of FIG. 1 is depicted as having a particular number of components, the system 100 is capable of having any number of additional or alternative components (e.g., any number of servers, client devices, or other components in communication with the digital asset recommendation system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 9). Moreover, the server(s) 102 and the client devices 110a-110n include one of a variety of computing devices (including one or more computing devices as discussed in greater detail with relation to FIG. 9).

As mentioned above, the system 100 includes the server(s) 102. In one or more embodiments, the server(s) 102 generates, stores, receives, and/or transmits data, including digital images and digital assets created from digital images. For example, in some embodiments, the server(s) 102 receives a digital image from a client device (e.g., one of the client devices 110a-110n) and transmits a digital asset created using the digital image to the client device in return. In one or more embodiments, the server(s) 102 comprises a data server. In some implementations, the server(s) 102 comprises a communication server or a web-hosting server.

As shown in FIG. 1, the server(s) 102 includes a visual design system 104. In one or more embodiments, the visual design system 104 provides functionality by which a client device (e.g., one of the client devices 110a-110n) generates, edits, manages, and/or stores visual designs, such as digital graphic designs, modified digital photographs, digitally created art, etc. For example, in some implementations, a client device creates a canvas for generating a visual design via the visual design system 104. The visual design system 104 then provides many options for the client device to use in creating a visual design, such as by applying one or more digital assets to the canvas.

Additionally, the server(s) 102 include the digital asset recommendation system 106. In particular, in one or more embodiments, the digital asset recommendation system 106 utilizes the server(s) 102 to generate one or more digital assets from a digital image. For example, in some cases, the digital asset recommendation system 106 utilizes the servers to receive a digital image, create one or more digital assets from the digital image, and provide a recommendation including at least one of the digital assets. As shown in FIG. 1, the digital asset recommendation system 106 includes the asset-recommendation-machine-learning model 114. In some cases, the digital asset recommendation system 106 utilizes the server(s) 102 to generate and recommend the one or more digital assets via the asset-recommendation-machine-learning model 114.

To illustrate, in one or more embodiments, the digital asset recommendation system 106, via the server(s) 102, determines a digital asset class associated with a digital image from among a set of different digital asset classes utilizing the asset-recommendation-machine-learning model 114. Further, via the server(s) 102, the digital asset recommendation system 106 generates a digital asset corresponding to the digital asset class from the digital image and utilizing the asset-recommendation-machine-learning model 114. Via the server(s) 102, the digital asset recommendation system 106 further generates a recommended digital asset associated with the digital asset class from the digital asset.

In one or more embodiments, the client devices 110a-110n include computing devices that are capable of generating digital assets from digital images. For example, the client devices 110a-110n include one or more of smartphones, tablets, desktop computers, laptop computers, head-mounted-display devices, and/or other electronic devices. In some instances, the client devices 110a-110n include one or more applications (e.g., the visual design applications 112a-112n, respectively) that are capable of generating digital assets from digital images. For example, in one or more embodiments, the visual design applications 112a-112n include a software application installed on the client devices 110a-110n, respectively. Additionally, or alternatively, the visual design applications 112a-112n include a software application hosted on the server(s) 102 (and supported by the visual design system 104), which is accessible by the client devices 110a-110n, respectively, through another application, such as a web browser.

In particular, in some implementations, the digital asset recommendation system 106 on the server(s) 102 supports the digital asset recommendation system 106 on the client device 110n. For instance, the digital asset recommendation system 106 on the server(s) 102 learns parameters for the asset-recommendation-machine-learning model 114. The digital asset recommendation system 106 then, via the server(s) 102, provides the asset-recommendation-machine-learning model 114 to the client device 110n. In other words, the client device 110n obtains (e.g., downloads) the asset-recommendation-machine-learning model 114 with the learned parameters from the server(s) 102. Once downloaded, the digital asset recommendation system 106 on the client device 110n is able to utilize the asset-recommendation-machine-learning model 114 to generate digital assets from digital images independent from the server(s) 102.

In alternative implementations, the digital asset recommendation system 106 includes a web hosting application that allows the client device 110n to interact with content and services hosted on the server(s) 102. To illustrate, in one or more implementations, the client device 110n accesses a web page supported by the server(s) 102. The client device 110n provides a digital image to the server(s) 102, and, in response, the digital asset recommendation system 106 on the server(s) 102 generates one or more digital assets from the digital image. The server(s) 102 then provides the digital asset(s) to the client device 110n for implementation or further editing.

Indeed, the digital asset recommendation system 106 is able to be implemented in whole, or in part, by the individual elements of the system 100. Indeed, although FIG. 1 illustrates the digital asset recommendation system 106 implemented with regard to the server(s) 102, different components of the digital asset recommendation system 106 can be implemented by a variety of devices within the system 100. For example, in one or more implementations, one or more (or all) components of the digital asset recommendation system 106 are implemented by a different computing device (e.g., one of the client devices 110a-110n) or a separate server from the server(s) 102 hosting the visual design system 104. Indeed, as shown in FIG. 1, the client devices 110a-110n include the digital asset recommendation system 106 (as well as the asset-recommendation-machine-learning model 114). Example components of the digital asset recommendation system 106 will be described below with regard to FIG. 7.

Figure 2:
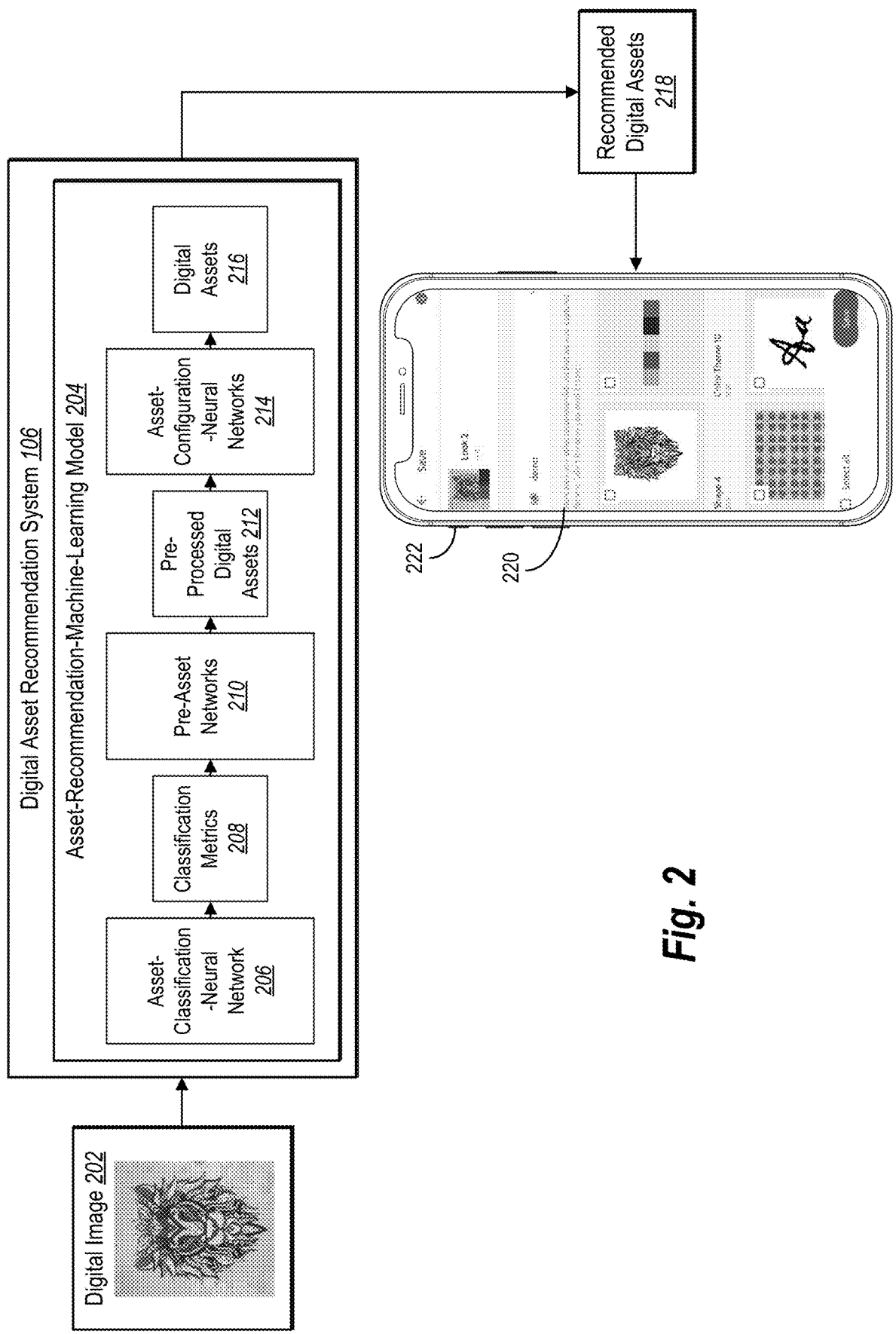
FIG. 2 illustrates an overview diagram of the digital asset recommendation system generating recommended digital assets from a digital image in accordance with one or more embodiments.

As mentioned above, in one or more embodiments, the digital asset recommendation system 106 generates one or more digital assets from a digital image. FIG. 2 illustrates an overview diagram of the digital asset recommendation system 106 generating digital assets from a digital image in accordance with one or more embodiments.

In one or more embodiments, a digital asset includes a graphical object or a textual object. Such a digital asset can include, for example, a digital graphic, image, or icon, as well as digital text or digital characters. In particular, in some embodiments, a digital asset includes a graphical object or a textual object that is used as a building block for a visual design. For instance, in some cases, a digital asset includes a digital element that can be inserted into a visual design or otherwise applied to one or more other elements (e.g., objects) of the visual design to affect their appearance. In one or more embodiments, a digital asset includes, but is not limited to, a shape asset, a pattern asset, a color palette asset, a color gradient asset, a font asset, or a font theme asset. In some implementations, a digital asset includes a production-ready digital visual design element having a configuration applied thereto (e.g., in contrast to a preprocessed digital asset discussed below).

In some cases, a shape asset includes a digital object. In particular, in some cases, a shape asset includes vector object, such as a scalable vector graphic (SVG) depicted in a digital image. In some implementations, a shape asset includes a gray scale or black-and-white variation of a digital object depicted in a digital image.

In some implementations, a pattern asset includes a repetitive visual sequence. For instance, in some cases, a pattern asset includes a repetitive sequence of a portion of a digital image, such as one or more digital objects portrayed in the digital image and/or the portion(s) of the digital image surrounding the digital object(s). In some embodiments, the portion of the digital image used in the pattern asset is arranged in a tile that consists of its own configuration having multiple instances of the portion of the digital image (e.g., multiple instances of a digital object oriented or positioned differently within the tile). Thus, in one or more embodiments, the digital asset recommendation system 106 utilizes an arrangement of a portion of a digital image to generate a tile and uses a repetitive pattern of the tile to create a pattern asset.

In some embodiments, a color palette asset includes a color theme or a color selection. For instance, in some cases, a color palette asset includes a selection of a subset of colors portrayed within a digital image (e.g., a color palette). To illustrate, in some implementations, a color palette asset includes a selection of one or more colors portrayed within a foreground of a digital image. In some cases, however, a color palette includes one or more colors from a background of the digital image.

In one or more embodiments, a color gradient asset includes a gradient or variation of colors from dark to bright (or vice versa). In particular, in some embodiments, a color gradient asset includes a gradient of the colors portrayed in at least a portion of a digital image. For example, in some embodiments, a color gradient asset includes a variation of the colors portrayed within a background of a digital image. In some cases, however, a color gradient asset includes a gradient of the colors portrayed in the foreground of the digital image.

In some implementations, a font asset includes a particular design or a particular style of a typeface for a collection of characters. In particular, in some implementations, a font asset includes a character style (e.g., a font) associated with text depicted in a digital image. A font can likewise include a combination of a typeface and other stylistic qualities for a collection of characters, such as pitch, spacing, and size. In some cases, a font asset further includes the text associated with the font. Relatedly, in one or more embodiments, a font theme asset includes a group of fonts. In particular, in some embodiments, a font theme asset includes a group of related fonts depicted in a digital image.

As shown in FIG. 2, the digital asset recommendation system 106 determines (e.g., identifies, receives, or otherwise obtains) a digital image 202 for use in generating one or more digital assets. In one or more embodiments, a digital image includes a digital visual representation (e.g., an image composed of digital data). In particular, in some embodiments, a digital image includes a digital file that is made of digital image data and is displayable via a graphical user interface. For example, in some implementations, a digital image includes a digital photo, a digital rendering (e.g., a scan or other digital reproduction) of a photograph or other document, or a frame of a digital video or other animated sequence. In some implementations, a digital image includes a digitally generated drawing, chart, map, graph, logo, or other graphic.

In one or more embodiments, the digital asset recommendation system 106 determines the digital image 202 by receiving the digital image 202 from a computing device (e.g., a server hosting a third-party system or a client device). In some embodiments, however, the digital asset recommendation system 106 determines the digital image 202 by accessing a database storing digital images. For example, in at least one implementation, the digital asset recommendation system 106 maintains a database and stores a plurality of digital images therein. In some instances, an external device or system stores digital images for access by the digital asset recommendation system 106.

In some embodiments, the digital asset recommendation system 106 determines the digital image 202 by receiving an indication of the digital image 202. For instance, in some cases, the digital asset recommendation system 106 receives a storage location of the digital image 202, a file name of the digital image 202, or a selection of the digital image 202. Accordingly, the digital asset recommendation system 106 retrieves the digital image 202 based on the received indication. To illustrate, in some instances, the digital asset recommendation system 106 operates on a computing device (e.g., the server(s) 102 or one of the client devices 110a-110n discussed above with reference to FIG. 1 or some other mobile computing device, such as a smart phone or tablet). Accordingly, in some embodiments, the digital asset recommendation system 106 retrieves the digital image 202 by accessing the digital image 202 from local storage or from a remote storage location that is accessible to the computing device.

As shown in FIG. 2, the digital asset recommendation system 106 utilizes an asset-recommendation-machine-learning model 204 to analyze the digital image 202. In one or more embodiments, a machine-learning model includes a computer representation that can be tuned (e.g., trained) based on inputs to approximate unknown functions. In particular, in some embodiments, a machine-learning model includes a model that utilizes algorithms to learn from, and make predictions on, known data by analyzing the known data to learn to generate outputs that reflect patterns and attributes of the known data. For instance, in some implementations, a machine-learning model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

In one or more embodiments, an asset-recommendation-machine-learning model includes a machine-learning model that generates digital assets from digital images. In particular, in some embodiments, an asset-recommendation-machine-learning model includes a machine-learning model that analyzes a digital image (e.g., analyzes features or characteristics of the digital image, such as colors, fonts, and/or digital objects portrayed in a digital image) and generates one or more recommended digital assets from the digital image. As will be discussed below, in some cases, an asset-recommendation-machine-learning model includes a machine-learning model that identifies digital asset classes that are associated with a digital image, generates a one or more digital assets that are from those digital asset classes, and selects at least one of the digital assets to provide via a recommendation. For instance, the asset-recommendation-machine-learning model can include various different networks, such as one or more asset-classification-neural networks, one or more pre-asset networks, and one or more asset-configuration-neural networks. In one or more embodiments, an asset-recommendation-machine-learning mode includes various components (e.g., models) for analyzing a digital image and generating one or more digital assets accordingly.

Indeed, as shown in FIG. 2, the digital asset recommendation system 106 utilizes various components of the asset-recommendation-machine-learning model 204 to analyze the digital image 202. For instance, as shown, the digital asset recommendation system 106 utilizes an asset-classification-neural network 206 to determine one or more digital asset classes associated with the digital image 202. In particular, the digital asset recommendation system 106 utilizes the asset-classification-neural network 206 to generate classification metrics 208 (e.g., within a string of labels) for the digital asset classes based on the digital image 202.

To provide some context, in one or more embodiments, a neural network includes a machine learning model that includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network comprises an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

In one or more embodiments, an asset-classification-neural network includes a computer-implemented neural network that determines digital asset classes that are associated with a digital image. In particular, in some embodiments, an asset-classification-neural network includes a neural network that analyzes a digital image (e.g., analyzes patent and/or latent features of the digital image) and determines one or more digital assets classes associated with the digital image based on the analysis. For instance, in some cases, an asset-classification-neural network generates a classification metric corresponding to one or more digital asset classes for the digital image. More detail regarding the asset-classification-neural network 206 will be provided below.

In one or more embodiments, a digital asset class includes a classification of digital assets. In particular, in some cases, a digital asset class includes a label associated with digital assets having one or more common characteristics or attributes. For instance, in some implementations, a digital asset class includes, but is not limited to, a shape asset class, a color asset class, a pattern asset class, or a font asset class. In some cases, a digital asset class is associated with multiple types of digital assets. For example, in one or more embodiments, a color asset class is associated with color palette assets and color gradient assets. As another example, in some cases, a font asset class is associated with font assets or font theme assets.

In one or more embodiments, a classification metric includes a measure of a relationship between a digital image and a corresponding digital asset class. In particular, in some embodiments, a classification metric includes a value that indicates the strength of the relationship between a digital image and a corresponding digital asset class. For instance, in some cases, a classification metric includes a probability that a digital image is associated with a corresponding digital asset class. In some cases, a classification metric includes a score value indicating how well the digital image and the corresponding digital asset class match. In one or more embodiments, the digital asset recommendation system 106 utilizes a classification metric corresponding to a digital asset class to determine whether or not the digital image is a candidate for use in generating a digital asset from that digital asset class.

In some implementations, the digital asset recommendation system 106 utilizes the asset-classification-neural network 206 of the asset-recommendation-machine-learning model 204 to generate classification metrics for the shape asset class, the color asset class, and the pattern asset class. In some cases, the digital asset recommendation system 106 utilizes a separate model for generating a classification metric for the font asset class as will be discussed in more detail below. In some embodiments, however, the digital asset recommendation system 106 utilizes the asset-classification-neural network 206 for generating the classification metric for the font asset class as well.

As further shown in FIG. 2, the digital asset recommendation system 106 utilizes pre-asset networks 210 of the asset-recommendation-machine-learning model 204 to generate, from the digital image 202, preprocessed digital assets 212 associated with the digital asset classes. For instance, in some cases, the digital asset recommendation system 106 utilizes the pre-asset networks 210 to generate one or more preprocessed digital assets from a digital asset class based on the classification metric for that digital asset class satisfying a threshold.

In one or more embodiments, a pre-asset network includes a computer-implemented model for generating preprocessed digital assets. In particular, in some embodiments, a pre-asset network includes a computer-implemented model that analyzes a digital image, identifies one or more areas of interest within the digital image, and generates one or more preprocessed digital assets using the area(s) of interest. In some cases, a pre-asset network includes a machine-learning model, such as a neural network. In some implementations, a pre-asset network includes a non-machine learning, computer-implemented model. More detail regarding the pre-asset networks 210 will be provided below.

In one or more embodiments, a preprocessed digital asset includes a digital asset that has been extracted, isolated, or segmented from a digital image. In particular, in some embodiments, a preprocessed digital asset includes a raw graphical object or textual object extracted, isolated, or segmented from a digital image before having a configuration applied thereto. For instance, in some cases, a preprocessed digital asset includes a graphical object or textual object generated by a pre-asset network. To illustrate, in some implementations, a preprocessed digital asset includes a preprocessed shape asset corresponding to a shape asset class or a pattern asset class, or a preprocessed color asset corresponding to a color asset class. In some cases, a preprocessed digital asset includes a preprocessed font asset or a preprocessed font theme asset corresponding to a font asset class; however, as will be shown in more detail below, the digital asset recommendation system 106 utilizes a pre-asset network to generate a finalized (e.g., configured) font asset or font theme asset from the digital image in some embodiments.

Additionally, as shown in FIG. 2, the digital asset recommendation system 106 utilizes asset-configuration-neural networks 214 of the asset-recommendation-machine-learning model 204 to generate digital assets 216 using the preprocessed digital assets 212.

In one or more embodiments, an asset-configuration-neural network includes a computer-implemented neural network that determines a configuration for a digital asset. In particular, in some embodiments, an asset-configuration-neural network includes a neural network that analyzes a preprocessed digital asset, determines a configuration for the preprocessed digital asset, and applies the configuration to the preprocessed digital asset to produce a digital asset. For instance, in some implementations, an asset-configuration-neural network determines a black-and-white or grayscale conversion for a digital object, an arrangement of a digital object within a tile, or a mood of a digital image for use in creating a color palette. To illustrate such networks, in some embodiments, an asset-configuration-neural network includes a neural network classifier. More detail regarding the asset-configuration-neural networks 214 will be discussed below.

As shown in FIG. 2, the digital asset recommendation system 106 selects recommended digital assets 218 from among the digital asset 216. In one or more embodiments, recommended digital asset includes a digital asset to be provided to a client device as part of a recommendation. In particular, in some cases, a recommended digital asset includes a digital asset from a digital image that is recommended for subsequent implementation. For example, in some cases, the digital asset recommendation system 106 selects a subset of the digital assets 216 for use as the recommended digital assets 218 (though, in some cases, the digital asset recommendation system 106 can use all of the digital assets 216 for use as the recommended digital assets 218). As shown in FIG. 2, in some implementations, the digital asset recommendation system 106 utilizes the asset-recommendation-machine-learning model 204 to determine the recommended digital assets 218 from the digital assets 216.

As further shown in FIG. 2, the digital asset recommendation system 106 provides the recommended digital assets 218 for display within a graphical user interface 220 of a client device 222. To illustrate, in one or more embodiments, the digital asset recommendation system 106 detects one or more user interactions via the graphical user interface 220 for generating a digital asset from the digital image 202 based on the one or more user interactions. In response to detecting the user interaction(s), the digital asset recommendation system 106 utilizes the asset-recommendation-machine-learning model 204 to generate the digital assets 216 and determines the recommended digital assets 218. Upon determining completion of the user-selected generation of the digital asset via the user interactions, the digital asset recommendation system 106 provides the recommended digital assets 218 for display within the graphical user interface 220. For instance, in some cases, the digital asset recommendation system 106 provides the recommended digital assets 218 for display within a save screen of the graphical user interface 220 for storing the manually generated digital asset. Thus, in some embodiments, the digital asset recommendation system 106 provides the recommended digital assets 218 for display along with the generated digital asset, enabling the client device 222 to efficiently select digital assets to store from among the recommended digital assets 218 while also storing the generated digital asset.

In some implementations, the digital asset recommendation system 106 further provides options for editing the recommended digital assets 218 via the graphical user interface 220. For instance, the digital asset recommendation system 106 provides the recommended digital assets 218 for display via the graphical user interface 220. In response to detecting a user selection of a recommended digital asset, the digital asset recommendation system 106 provides a selectable option for modifying the recommended digital asset. Upon further detection of a user selection of the selectable option, the digital asset recommendation system 106 provides one or more interactive elements for modifying the recommended digital asset via the graphical user interface 220.

Figure 3:
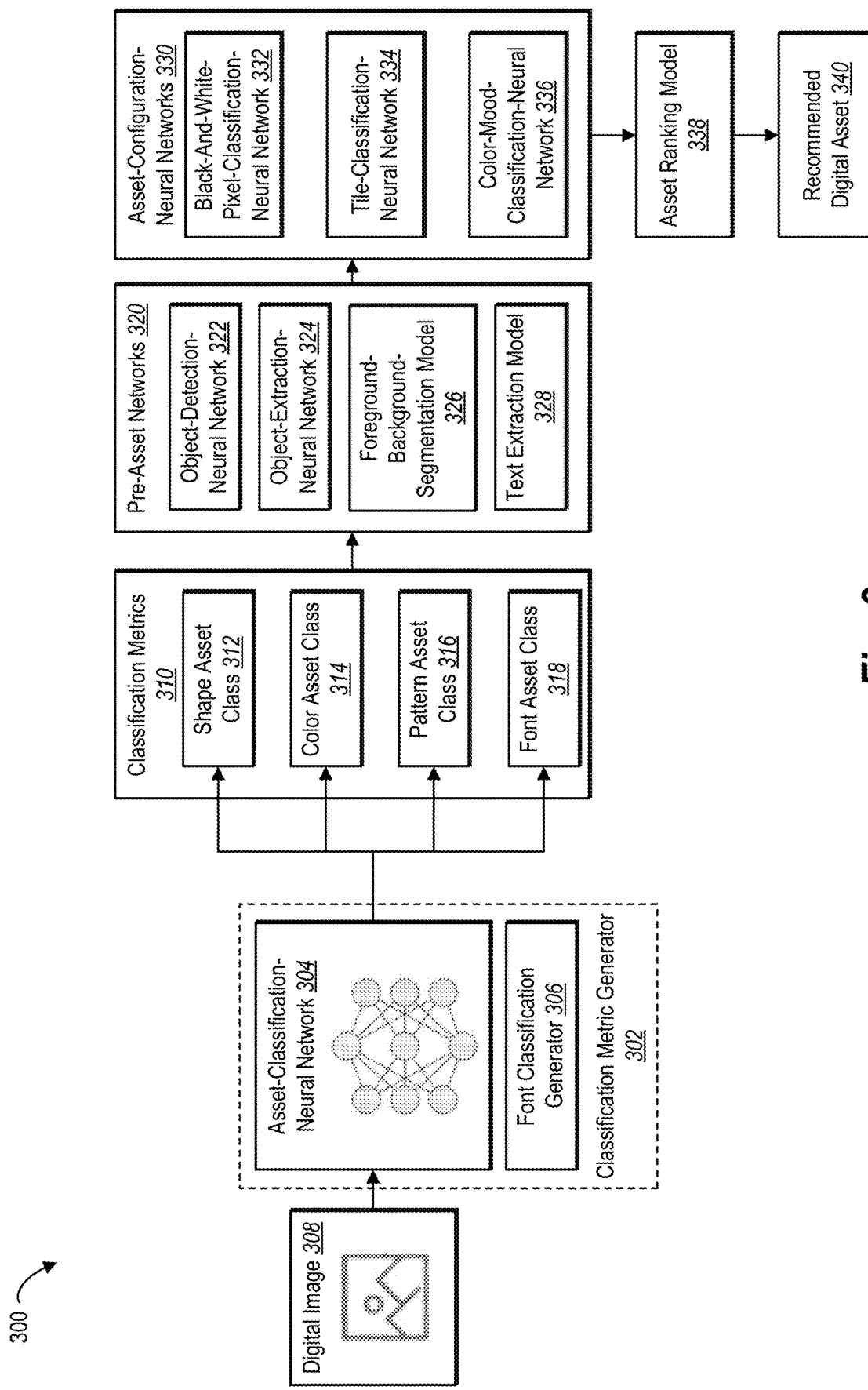
FIG. 3 illustrates an architecture of an asset-recommendation-machine-learning model in accordance with one or more embodiments.

As previously mentioned, in one or more embodiments, the digital asset recommendation system 106 utilizes an asset-recommendation-machine-learning model for generating digital assets from a digital image and determining recommended digital assets for provision to a client device. FIG. 3 illustrates an architecture of an asset-recommendation-machine-learning model in accordance with one or more embodiments.

As shown in FIG. 3, the asset-recommendation-machine-learning model 300 utilized by the digital asset recommendation system 106 includes a classification metric generator 302 for generating classification metrics. As illustrated by FIG. 3, the classification metric generator 302 includes an asset-classification-neural network 304. In one or more embodiments, the classification metric generator 302 includes various neural network layers, such as a convolutional layer, a depth-wise layer, and a sigmoid layer. In some embodiments, the asset-classification-neural network 304 includes a MobileNet architecture, such as the MobileNet v1 architecture described by Andrew G. Howard and Menglong Zhu, *MobileNets: Open-Source Models for Efficient On-device Vision*, Google AI Blog, https://ai.googleblog.com/2017/06/mobilenets-open-source-models-for.html (2017) or the MobileNet v2 architecture described by Mark Sandler and Andrew Howard, *MobileNetV2: The Next Generation of On-device Computer Vision Networks*, Google AI Blog, https://ai.googleblog.com/2018/04/mobilenetv2-next-generation-of-on.html (2018), both of which are incorporated herein by reference in their entirety. In some implementations, the asset-classification-neural network 304 includes one of the residual neural network architectures described by Vincent Feng, *An Overview of ResNet and its Variants*, https://towardsdatascience.com/an-overview-of-resnet-and-its-variants-5281e2f56035 (2017), which is incorporated herein by reference in its entirety.

As further shown, the classification metric generator 302 includes a font classification model 306. In one or more embodiments, a font classification model includes a computer-implemented model for generating a classification metric for a font asset class. In particular, in one or more embodiments, a font classification model includes a computer-implemented model that generates a classification metric for a font asset class based on text depicted in a digital image. To illustrate, in some cases, a font classification model generates a classification metric for a font asset class based on the height and length of the text depicted in the digital image. Indeed, in some cases, a font classification model generates a value for each of the text boxes (e.g., blocks of text) depicted in a digital image and combines the value determined for each text box to determine a classification metric for the font asset class.

Thus, as shown in FIG. 3, the digital asset recommendation system 106 provides a digital image 308 to the classification metric generator 302 of the asset-recommendation-machine-learning model 300. Further, the digital asset recommendation system 106 utilizes the classification metric generator 302 to generate classification metrics 310 for the digital asset classes. In particular, the digital asset recommendation system 106 utilizes the asset-classification-neural network 304 to generate classification metrics for various digital asset classes—such as a shape asset class 312, a color asset class 314, and a pattern asset class 316—based on an analysis of the digital image 308. The digital asset recommendation system 106 further utilizes the font classification model 306 to generate a classification metric for a font asset class 318 based on an analysis of the digital image 308.

As illustrated by FIG. 3, the asset-recommendation-machine-learning model 300 also includes pre-asset networks 320. In particular, as shown, the pre-asset networks 320 includes an object-detection-neural network 322. In one or more embodiments, an object-detection-neural network includes a computer-implemented neural network that detects salient features in a digital image. In particular, in some embodiments, an object-detection-neural network includes a neural network that detects one or more digital objects portrayed in a digital image. To illustrate, in some embodiments, an object-detection-neural network identifies a portion (e.g., a region) of a digital image that includes a digital object. Indeed, in some instances, an object-detection-neural network generates one or more bounding boxes from a digital image, where each bounding box includes a portion of the digital image that includes a digital object. In some cases, an object-detection-neural network includes a region-based neural network, such as a region-based convolutional neural network. For instance, in one or more embodiments, the object-detection-neural network 322 includes one of the region-based object detectors described in Jonathan Hui, *What Do We Learn From Region Based Object Detectors (Faster R-CNN, R-FCN, FPN)*, https://jonathan-hui.medium.com/what-do-we-learn-from-region-based-object-detectors-faster-r-cnn-r-fcn-fpn-7e354377a7c9 (2018), which is incorporated herein by reference in its entirety. In some embodiments, the object-detection-neural network 322 includes the faster region-based convolutional neural network (Faster R-CNN) described by Shaoqing Ren et al., *Faster R-CNN: Towards Real-time Object Detection with Region Proposal Networks*, https://arxiv.org/pdf/1506.01497.pdf (2016), which is incorporated herein by reference.

In one or more embodiments, a digital object includes an item or object portrayed in a digital image. In particular, in one or more embodiments, a digital object includes an organic or non-organic object depicted in a digital image. To illustrate, in some embodiments, a digital object includes, but is not limited to, a person, an animal, a building, a plant, a vehicle, a chair, or a handheld item.

As shown by FIG. 3, the pre-asset networks 320 further includes an object-extraction-neural network 324. In one or more embodiments, an object-extraction neural network includes a computer implemented neural network that extracts a digital object from a digital image. To illustrate, in some embodiments, an object-extraction-neural network includes a neural network that extracts a digital object from a portion of the digital image containing the digital object as identified by an object-detection-neural network. Indeed, in some cases, an object-extraction neural network utilizes a bounding box generated by an object-detection-neural network to extract a digital object portrayed therein. In some implementations, an object-extraction-neural network generates a mask for the digital object portrayed in the digital image. In some cases, the object-extraction-neural network further applies the mask to the digital image (e.g., to the bounding box) to extract the portrayed digital object. In one or more embodiments, an object-extraction-neural network includes a mask region-based neural network, such as a mask region-based convolutional neural network. Indeed, in some implementations, the object-extraction-neural network 324 includes the mask region convolutional neural network (Mask R-CNN) described by Elisha Odemakinde, *Mask R-CNN: A Beginner's Guide*, https://viso.ai/deep-learning/mask-r-cnn/(2021) or Heramb Devbhankar, *Instance Segmentation with Mask R-CNN*, https://towardsdatascience.com/instance-segmentation-with-mask-r-cnn-6e5c4132030b (2020), both of which are incorporated herein by reference in their entirety. In some embodiments, the object-extraction-neural network 324 includes the mask scoring regional convolutional neural network (MS R-CNN) described by Zhaojin Huang et al., *Mask Scoring R-CNN*, https://arxiv.org/pdf/1903.00241.pdf (2019), which is incorporated herein by reference.

Additionally, as shown, the pre-asset networks 320 include a foreground-background-segmentation model 326. In one or more embodiments, a foreground-background-segmentation model includes a computer-implemented model that separates the foreground of a digital image from the background of the digital image. In particular, in some embodiments, a foreground-background-segmentation model includes a computer-implemented model that implements various computer vision algorithms to extract the foreground from a digital image (e.g., digital objects portrayed in the digital image or a foreground landscape portrayed in the digital image). In some cases, a foreground-background-segmentation model generates a foreground image layer (e.g., an image that includes only a foreground) from the extracted foreground and generates a background image layer (e.g., an image that contains only a background) with the remaining background of the digital image. In one or more embodiments, the foreground-background-segmentation model includes one of the neural networks described above with reference to the object-detection-neural network 322 and the object-extraction-neural network 324. In some embodiments, the foreground-background-segmentation model 326 includes one or more of the image segmentation models described by Derrick Mwiti and Katherine (Yi) Li, *Image Segmentation in 2021: Architecture, Losses, Datasets, and Frameworks*, https://neptune.ai/blog/image-segmentation-in-2020 (2021), which is incorporated herein by reference.

Further, as shown in FIG. 3, the pre-asset networks 320 include a text extraction model 328. In one or more embodiments, a text extraction model includes a computer-implemented model that extracts one or more fonts (e.g., texts) from a digital image. In particular, in some embodiments, a text extraction model includes a model that identifies and extracts one or more fonts based on a text height and/or text length of the text boxes associated with the font. For instance, in some cases, a text extraction model determines the text length and text height of each text box depicted in a digital image, determines a value for each text box based on their text length and text height, and selects one or more fonts based on the values determined for their corresponding text boxes. To illustrate, in some cases, the text extraction model selects one or more fonts associated with the highest values.

Thus, the digital asset recommendation system 106 utilizes the pre-asset networks 320 to generate preprocessed digital assets from the digital image 308. Indeed, in some cases, the digital asset recommendation system 106 provides the digital image 308 to the pre-asset networks 320 and utilizes the pre-asset networks 320 to generate one or more preprocessed digital assets for one or more digital asset classes. In some cases, the digital asset recommendation system 106 utilizes one of the pre-asset networks 320 to generate a preprocessed digital asset for a digital asset class. In some implementations, however, the digital asset recommendation system 106 utilizes multiple pre-asset networks to generate a preprocessed digital asset. More detail regarding the pre-asset network(s) used in generating a particular preprocessed digital asset will be discussed below with reference to FIGS. 4A-4E.

As illustrated by FIG. 3, the asset-recommendation-machine-learning model 300 further includes asset-configuration-neural networks 330. In particular, the asset-configuration-neural networks 330 include a black-and-white-pixel-classification-neural network 332. In one or more embodiments, a black-and-white-pixel-classification-neural network includes a computer-implemented neural network that determines a value for converting an image to black-and-white or grayscale. In particular, in some embodiments, a black-and-white-pixel-classification-neural network includes a neural network that determines a value for generating a black-and-white or grayscale object from a digital object portrayed in a digital image. For instance, in some cases, a black-and-white-pixel-classification-neural network determines a threshold value for converting a particular pixel of a digital object to black or white depending on a value (e.g., an RGB value) associated with that pixel. In some cases, the black-and-white-pixel-classification-neural network determines a range of values for converting pixels to grayscale.

As further illustrated by FIG. 3, the asset-configuration-neural networks 330 includes a tile-classification-neural network 334. In one or more embodiments, a tile-classification-neural network includes a computer-implemented neural network that determines a tile configuration using a digital object extracted from a digital image. In particular, in some embodiments, a tile-classification-neural network includes a neural network that determines an arrangement of a digital object within a tile. For instance, in some cases, a tile-classification-neural network generates probabilities or other values for a pre-determined set of tile arrangements based on a digital object extracted from a digital image.

Additionally, as illustrated in FIG. 3, the asset-configuration-neural networks 330 include a color-mood-classification-neural network 336. In one or more embodiments, a color-mood-classification-neural network includes a computer-implemented neural network that determines a color mood for a digital image. In particular, in some embodiments, a color-mood-classification-neural network includes a neural network that determines a color mood for a digital image based on a foreground of the digital image. To illustrate, in some implementations, a color-mood-classification-neural network generates probabilities or other values for a pre-determined set of color moods based on a foreground image layer generated from a digital image.

In one or more embodiments, the black-and-white-pixel-classification-neural network 332, the tile-classification-neural network 334, and/or the color-mood-classification-neural network 336 include the same neural network architecture described above with reference to the asset-classification-neural network 304 (e.g., the MobileNet v1 architecture, the MobileNet v2 architecture, or one of the residual neural network architectures described above).

Thus, in one or more embodiments, the digital asset recommendation system 106 provides the preprocessed digital assets generated by the pre-asset networks 320 to the asset-configuration-neural networks 330. Further, the digital asset recommendation system 106 utilizes the asset-configuration-neural networks 330 to generate digital assets from the preprocessed digital assets. More detail regarding the asset-configuration-neural network used in generating a particular digital asset will be discussed below with reference to FIGS. 4A-4E.

As further shown in FIG. 3, the asset-recommendation-machine-learning model 300 includes an asset ranking model 338. In one or more embodiments, the asset ranking model 338 selects one or more digital assets from among the digital assets generated by the asset-configuration-neural networks 330 for use as recommended digital assets. In some cases, the asset ranking model 338 selects from the digital assets based on an asset score associated with each digital asset. In one or more embodiments, an asset score includes a quantitative value associated with a digital asset. In particular, in some embodiments, an asset score includes a numerical value that indicates a quality of a digital asset or a relevance of the digital asset to the digital image from which the digital asset was generated.

Indeed, in some embodiments, the asset ranking model 338 determines an asset score for each digital asset generated by the asset-configuration-neural networks 330, ranks the digital assets based on their corresponding asset scores (e.g., by comparing their asset scores), and selects one or more digital assets for use as recommended digital assets based on the ranking. In one or more embodiments, the asset-recommendation-machine-learning model 300 generates a score value to be associated with a digital asset at each stage of the generation process and determines the asset score for the digital asset by combining the score values associated with that digital asset. Indeed, in one or more embodiments, a score value includes a quantitative value associated with a digital asset and generated at a particular stage of the digital asset generation process. To illustrate, in some embodiments, a score value includes a quantitative value associated with a digital asset as determined by the asset-classification-neural network 304, at least one of the pre-asset networks 320, or one of the asset-configuration-neural networks 330. Thus, in some cases, an asset score includes a combination of score values. More detail regarding determining the score values for digital assets will be provided below with reference to FIGS. 4A-4E.

Thus, the digital asset recommendation system 106 utilizes the asset-recommendation-machine-learning model 300 to determine a recommended digital asset 340 from a digital image. Though a single recommended digital asset is shown, in some implementations, the digital asset recommendation system 106 utilizes the asset-recommendation-machine-learning model 300 to determine multiple recommended digital assets from a digital image. As an example, the digital asset recommendation system 106 can utilize the asset-recommendation-machine-learning model to generate a shape asset, a pattern asset, and a color palette asset based on a single digital image, as will be discussed below with reference to FIG. 6.

As mentioned above, the digital asset recommendation system 106 utilizes different components of an asset-recommendation-machine-learning model to generate different digital assets. In particular, the digital asset recommendation system 106 utilizes a particular set of components of the asset-recommendation-machine-learning model to generate digital assets of a particular digital asset class. FIGS. 4A-4E illustrate diagrams for utilizing components of an asset-recommendation-machine-learning model 400 to generate various digital assets in accordance with one or more embodiments. While a single version of the asset-recommendation-machine-learning model 400 can include various asset-classification-neural networks, pre-asset networks, and asset-configuration-neural networks depicted in FIGS. 4A-4E, the following paragraphs describe the digital asset recommendation system 106 utilizing only a subset of such asset-classification-neural networks, pre-asset networks, and asset-configuration-neural networks when generating particular digital assets. As suggested by FIGS. 4A-4E and described further below, the digital asset recommendation system 106 can intelligently detect a certain digital asset class from a digital image and utilize a select subset of such asset-classification-neural networks, pre-asset networks, and asset-configuration-neural networks to generate a corresponding digital asset based on the detected digital asset class and various thresholds.

Figure 4A:
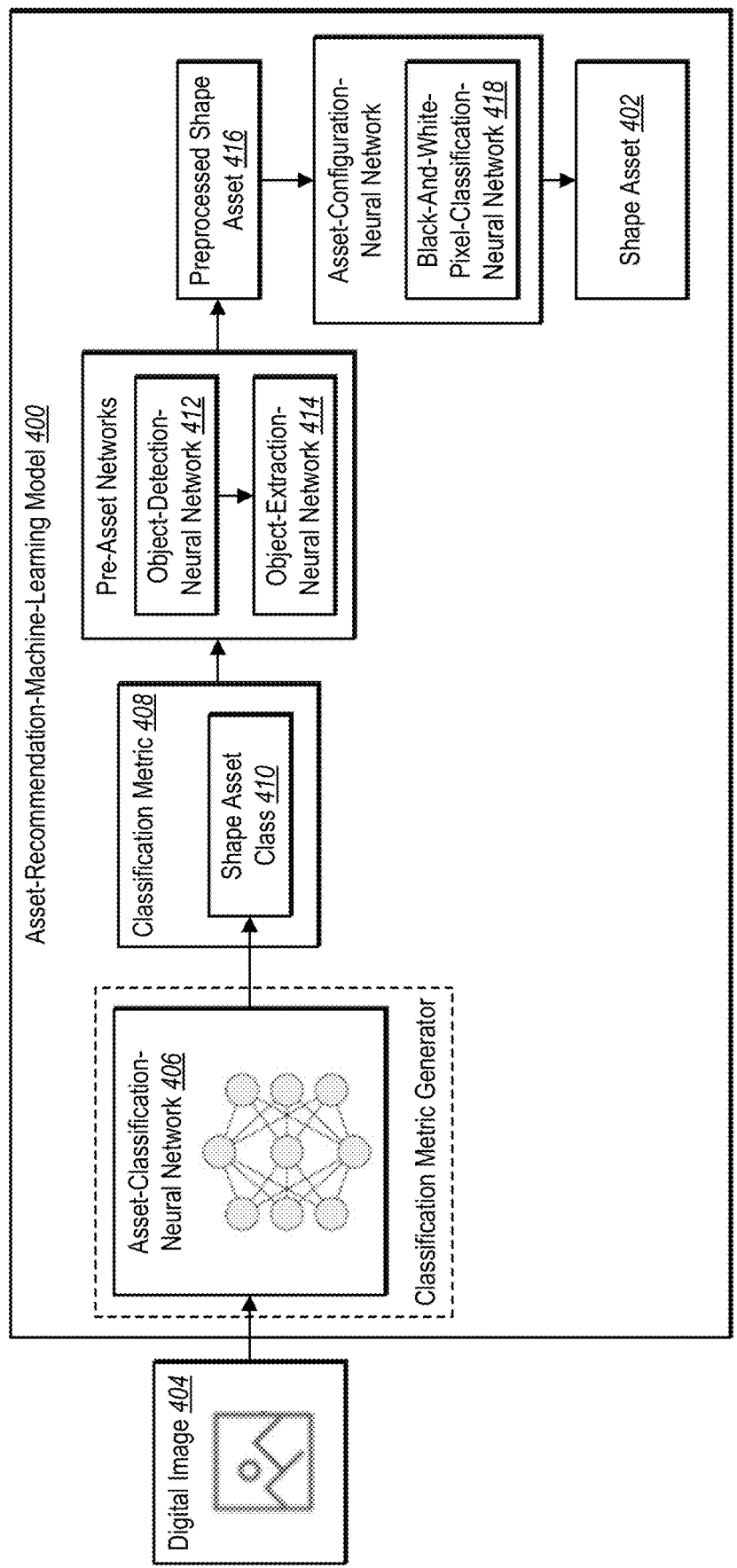
FIGS. 4A-4E illustrate diagrams for utilizing components of an asset-recommendation-machine-learning model to generate various digital assets in accordance with one or more embodiments.

In accordance with one or more embodiments, FIG. 4A illustrates a diagram of the digital asset recommendation system 106 utilizing various components of the asset-recommendation-machine-learning model 400 to generate a shape asset 402 corresponding to a shape asset class from a digital image 404.

Indeed, as shown in FIG. 4A, the digital asset recommendation system 106 utilizes an asset-classification-neural network 406 of the asset-recommendation-machine-learning model 400 to generate a classification metric 408 for a shape asset class 410 based on an analysis of the digital image 404. In one or more embodiments, the digital asset recommendation system 106 determines to use the classification metric 408 as the score value for the shape asset 402 from that stage of the generation process.

As further shown in FIG. 4A, the digital asset recommendation system 106 utilizes an object-detection-neural network 412 and an object-extraction-neural network 414 of the asset-recommendation-machine-learning model 400 to generate a preprocessed shape asset 416 from the digital image 404. In particular, in some cases, the object-detection-neural network 412 detects an object portrayed in the digital image 404 by identifying a bounding box that includes the digital object, and the object-extraction-neural network 414 extracts the digital object from the digital image 404 using the identified bounding box. In one or more embodiments, the digital asset recommendation system 106 determines to use the portion (e.g., percentage) of the digital image 404 occupied by the identified bounding box as a score value for the shape asset 402. In some cases, the digital asset recommendation system 106 further utilizes a confidence score generated by the object-extraction-neural network 414 in generating and/or applying the mask for the digital object as another score value for the shape asset 402.

Additionally, as shown, the digital asset recommendation system 106 utilizes a black-and-white-pixel-classification-neural network 418 of the asset-recommendation-machine-learning model 400 to generate the shape asset 402 from the preprocessed shape asset 416. In particular, the digital asset recommendation system 106 utilizes the black-and-white-pixel-classification-neural network 418 to determine a threshold value for converting the extracted digital object to black-and-white (or ranges of values for converting the digital object to grayscale). The digital asset recommendation system 106 further applies the threshold value (or ranges of values) to the preprocessed shape asset 416 (e.g., the extracted digital object) to generate a black-and-white object (or grayscale object). In one or more embodiments, the digital asset recommendation system 106 determines to use the threshold value determined by the black-and-white-pixel-classification-neural network 418 as the score value for the shape asset 402 at that stage of the generation process.

Thus, in one or more embodiments, the digital asset recommendation system 106 generates the shape asset 402 from the digital image 404 by generating a black-and-white or grayscale object (e.g., shape vector) using a digital object depicted in the digital image 404. Further, in one or more embodiments, the digital asset recommendation system 106 determines an asset score for the shape asset 402 by combining the score values determined from the asset-classification-neural network 406, the object-detection-neural network 412, the object-extraction-neural network 414, and/or the black-and-white-pixel-classification-neural network 418. In some instances, the digital asset recommendation system 106 normalizes or applies weights to the score values before combining them to determine the asset score.

Figure 4B:
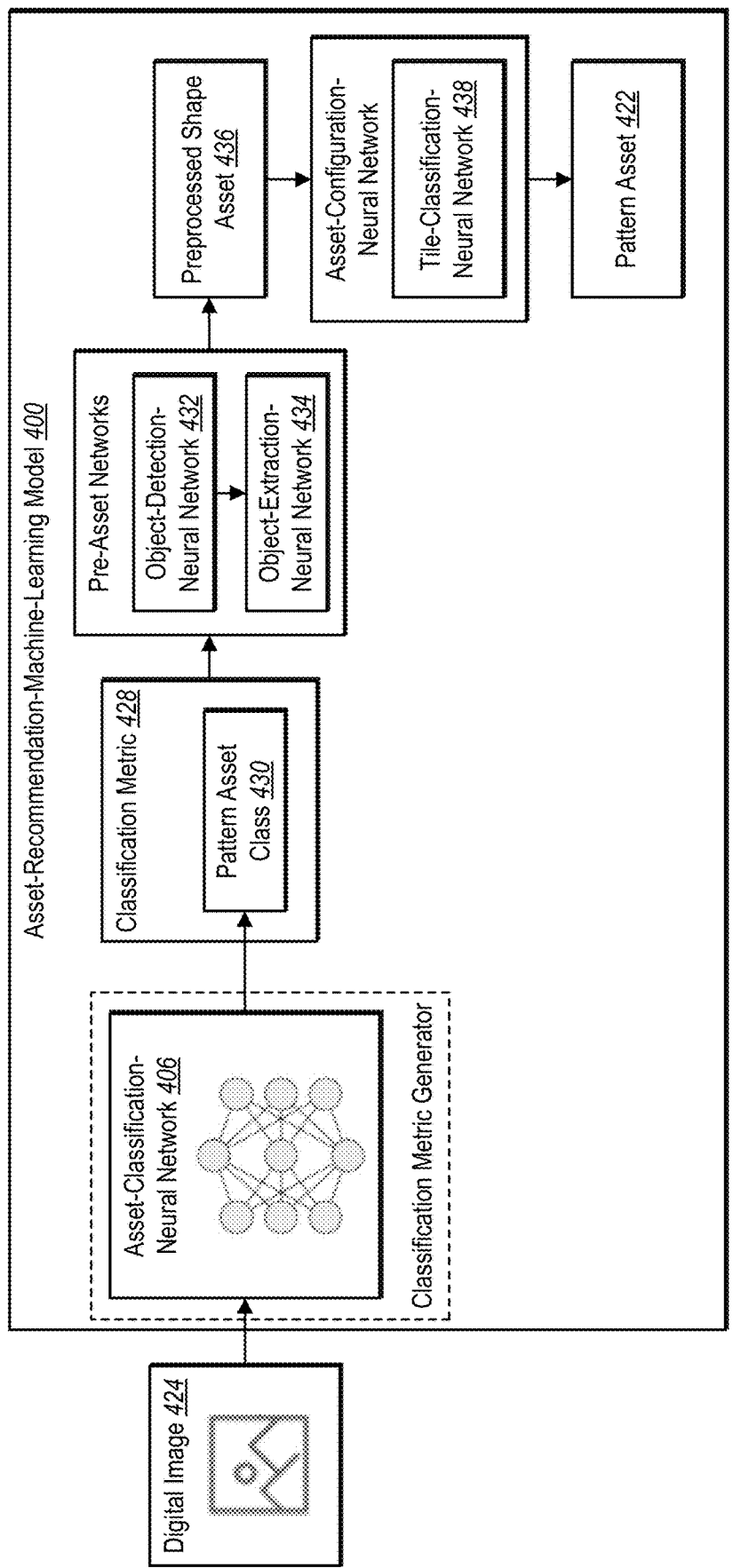

FIG. 4B illustrates a diagram of the digital asset recommendation system 106 utilizing various components of the asset-recommendation-machine-learning model 400 to generate a pattern asset 422 corresponding to a pattern asset class from a digital image 424 in accordance with one or more embodiments.

As shown in FIG. 4B, the digital asset recommendation system 106 utilizes an asset-classification-neural network 406 of the asset-recommendation-machine-learning model 400 to generate a classification metric 428 for a pattern asset class 430 based on an analysis of the digital image 424. In one or more embodiments, the digital asset recommendation system 106 determines to use the classification metric 428 as the score value for the pattern asset 422 from that stage of the generation process.

As further shown in FIG. 4B, and as discussed above with reference to FIG. 4A, the digital asset recommendation system 106 utilizes an object-detection-neural network 432 and an object-extraction-neural network 434 of the asset-recommendation-machine-learning model 400 to generate a preprocessed shape asset 436 from the digital image 424.

Further, as discussed above with reference to FIG. 4A, the digital asset recommendation system 106 determines to use—as score values for the pattern asset 422—the portion of the digital image 424 occupied by the identified bounding box including the extracted digital object and/or the confidence score in generating and/or applying a mask for the digital object.

Additionally, as shown in FIG. 4B, the digital asset recommendation system 106 utilizes a tile-classification-neural network 438 of the asset-recommendation-machine-learning model 400 to generate the pattern asset 422 from the preprocessed shape asset 436. In particular, the digital asset recommendation system 106 utilizes the preprocessed shape asset 436 to determine an arrangement of the extracted digital object within a tile by, for example, generating probabilities or other values for a pre-determined set of tile arrangements. The digital asset recommendation system 106 further generates a tile having the determined arrangement (e.g., the tile arrangement having the highest probability or one of the highest probabilities when generating multiple pattern assets) and generates a pattern using a repetitive sequence of the tile. In one or more embodiments, the digital asset recommendation system 106 determines to use the probability or other score value generated by the tile-classification-neural network 438 for the particular tile arrangement as the score value for the pattern asset 422 at that stage of the generation process.

Thus, in one or more embodiments, the digital asset recommendation system 106 generates the pattern asset 422 from the digital image 424 by generating a pattern of tile arrangements configured using a digital object depicted in the digital image 424. Further, in one or more embodiments, the digital asset recommendation system 106 determines an asset score for the pattern asset 422 by combining the score values determined from the asset-classification-neural network 406, the object-detection-neural network 432, the object-extraction-neural network 434, and/or the tile-classification-neural network 438. In some instances, the digital asset recommendation system 106 normalizes or applies weights to the score values before combining them to determine the asset score.

Figure 4C:
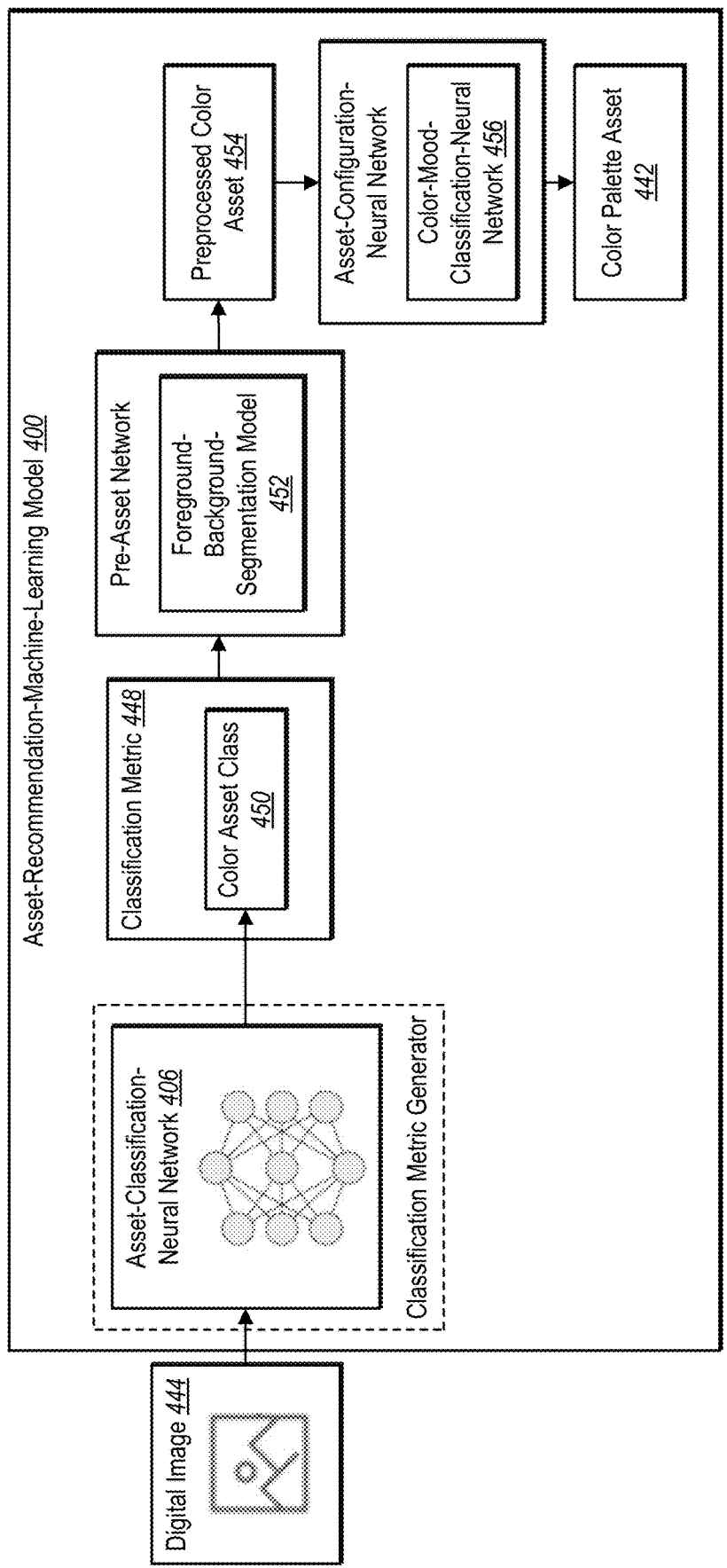

FIG. 4C illustrates a diagram of the digital asset recommendation system 106 utilizing various components of the asset-recommendation-machine-learning model 400 to generate a color palette asset 442 corresponding to a color asset class from a digital image 444 in accordance with one or more embodiments.

Indeed, as shown in FIG. 4C, the digital asset recommendation system 106 utilizes an asset-classification-neural network 406 of the asset-recommendation-machine-learning model 400 to generate a classification metric 448 for a color asset class 450 based on an analysis of the digital image 444. In one or more embodiments, the digital asset recommendation system 106 determines to use the classification metric 448 as the score value for the color palette asset 442 from that stage of the generation process.

As further shown in FIG. 4C, the digital asset recommendation system 106 utilizes a foreground-background-segmentation model 452 of the asset-recommendation-machine-learning model 400 to generate a preprocessed color asset 454 from the digital image 444. In particular, in some embodiments, the digital asset recommendation system 106 utilizes the foreground-background-segmentation model 452 to generate the preprocessed color asset 454 corresponding to the color palette asset 442 by generating a foreground image layer from the digital image 444. Indeed, as discussed above, in one or more embodiments, the foreground-background-segmentation model 452 extracts the foreground from the digital image 444 (e.g., extracts objects depicted in the digital image and/or other foreground elements) and uses the extracted foreground as a foreground image layer. In one or more embodiments, the digital asset recommendation system 106 determines a score for the foreground image layer (e.g., based on a portion of the digital image 444 occupied by the foreground image layer) and utilizes the score as a score value for the color palette asset 442.

As further shown in FIG. 4C, the digital asset recommendation system 106 utilizes a color-mood-classification-neural network 456 of the asset-recommendation-machine-learning model 400 to generate the color palette asset 442 from the preprocessed color asset 454. In particular, the digital asset recommendation system 106 utilizes the color-mood-classification-neural network 456 to determine a color mood of the digital image 444 by, for example, generating probabilities or other values for a pre-determined set of color moods (e.g., colorful, bright, dark, muted, deep) based on the foreground image layer. The digital asset recommendation system 106 further generates a color palette corresponding to the determined color mood (e.g., the color mood having the highest probability or one of the highest probabilities when generating multiple color palette assets) using colors depicted in the foreground image layer. For instance, in some cases, the digital asset recommendation system 106 utilizes a mapping of colors to color moods to identify one or more of the colors included in the foreground image layer that correspond to the determined color mood. The digital asset recommendation system 106 generates a color palette using those colors. In one or more embodiments, the digital asset recommendation system 106 determines to use the probability or other score value generated by the color-mood-classification-neural network 456 for the particular color mood as the score value for the color palette asset 442 at that stage of the generation process.

Thus, in one or more embodiments, the digital asset recommendation system 106 generates the color palette asset 442 from the digital image 444 by generating a selection of colors chosen from the foreground of the digital image 444. Further, in one or more embodiments, the digital asset recommendation system 106 determines an asset score for the color palette asset 442 by combining the score values determined from the asset-classification-neural network 406, the foreground-background-segmentation model 452, and/or the color-mood-classification-neural network 456. In some instances, the digital asset recommendation system 106 normalizes or applies weights to the score values before combining them to determine the asset score.

Figure 4D:
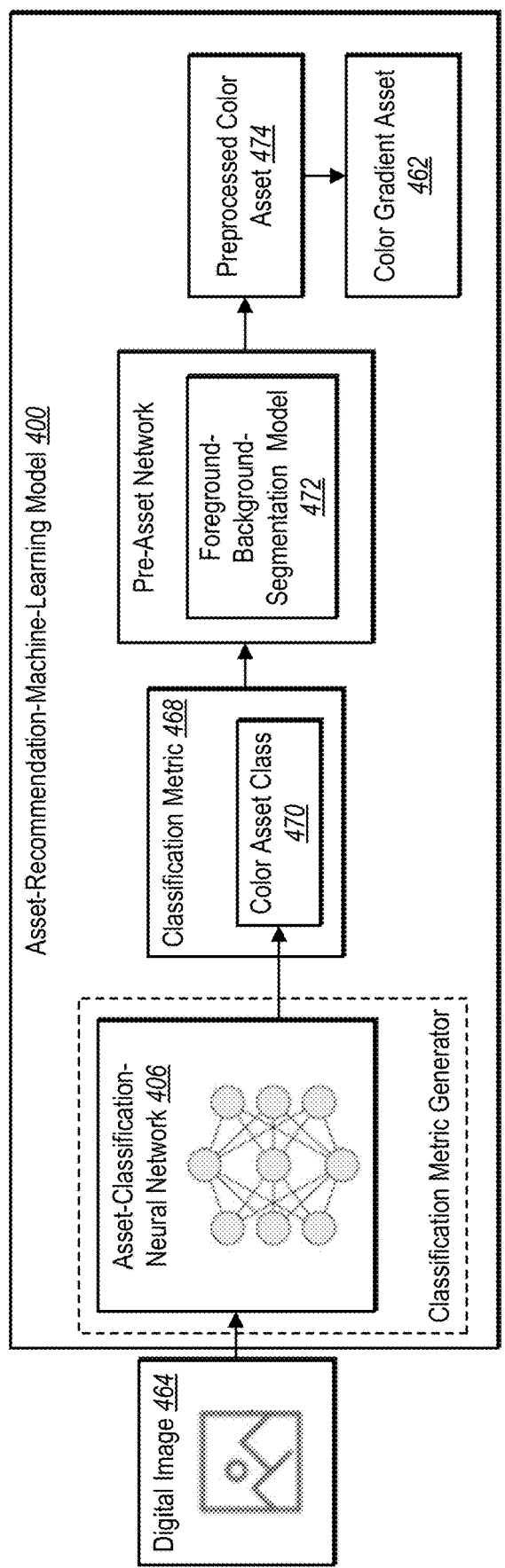

In accordance with one or more embodiments, FIG. 4D illustrates a diagram of the digital asset recommendation system 106 using various components of the asset-recommendation-machine-learning model 400 to generate a color gradient asset 462 corresponding to a color asset class from a digital image 464.

Indeed, as shown in FIG. 4D, the digital asset recommendation system 106 utilizes an asset-classification-neural network 406 of the asset-recommendation-machine-learning model 400 to generate a classification metric 468 for a color asset class 470 based on an analysis of the digital image 464. In one or more embodiments, the digital asset recommendation system 106 determines to use the classification metric 468 as the score value for the color gradient asset 462 from that stage of the generation process.

As further shown in FIG. 4D, the digital asset recommendation system 106 utilizes a foreground-background-segmentation model 472 of the asset-recommendation-machine-learning model 400 to generate a preprocessed color asset 474 from the digital image 464. In particular, in some embodiments, the digital asset recommendation system 106 utilizes the foreground-background-segmentation model 472 to generate the preprocessed color asset 474 corresponding to the color gradient asset 462 by generating a background image layer from the digital image 464. Indeed, as discussed above, in one or more embodiments, the foreground-background-segmentation model 472 extracts the foreground from the digital image 464 (e.g., extracts objects depicted in the digital image and/or other foreground elements) and uses the remaining background as a background image layer. In one or more embodiments, the digital asset recommendation system 106 determines a score for the background image layer (e.g., based on a portion of the digital image 464 occupied by the background image layer) and utilizes the score as a score value for the color gradient asset 462.

As further shown in FIG. 4D, the digital asset recommendation system 106 generates the color gradient asset 462 from the preprocessed color asset 474. Indeed, in one or more embodiments, the digital asset recommendation system 106 extracts the colors from the background image layer and arranges the colors to form a color gradient. The digital asset recommendation system 106 can arrange the colors from dark to light, light to dark, or otherwise using the light color spectrum. In one or more embodiments, the digital asset recommendation system 106 determines a value score for the color gradient asset 462 based on the resulting color gradient. For instance, in some cases, the digital asset recommendation system 106 determines a value score based on the range of color represented in the color gradient or the smoothness of the transition of color represented in the background image layer.

Thus, in one or more embodiments, the digital asset recommendation system 106 generates the color gradient asset 462 from the digital image 464 by generating a gradient of colors chosen from the background of the digital image 464. Further, in one or more embodiments, the digital asset recommendation system 106 determines an asset score for the color gradient asset 462 by combining the score values determined from the asset-classification-neural network 406, the foreground-background-segmentation model 472, and/or the resulting color gradient. In some instances, the digital asset recommendation system 106 normalizes or applies weights to the score values before combining them to determine the asset score.

Figure 4E:
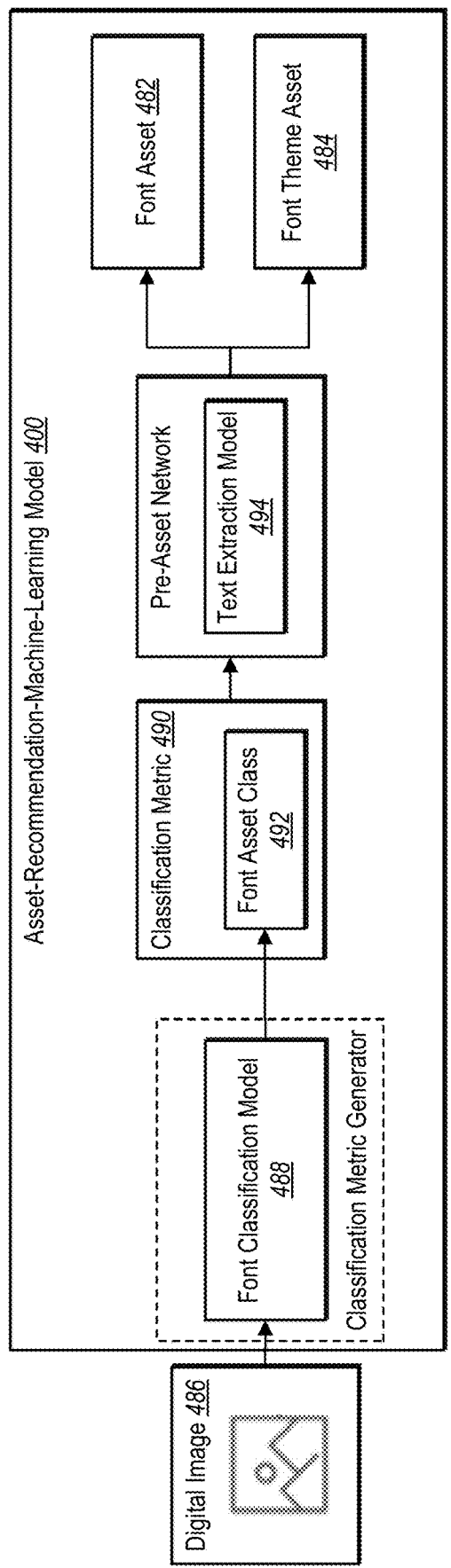

In accordance with one or more embodiments, FIG. 4E illustrates a diagram of the digital asset recommendation system 106 using various components of the asset-recommendation-machine-learning model 400 to generate a font asset 482 or a font theme asset 484 corresponding to a color asset class from a digital image 486.

Indeed, as shown in FIG. 4E, the digital asset recommendation system 106 utilizes a font classification model 488 of the asset-recommendation-machine-learning model 400 to generate a classification metric 490 for a font asset class 492 based on an analysis of the digital image 486. For example, in some embodiments, the font classification model 488 determines the classification metric 490 based on the text heights and text lengths of the text boxes depicted in the digital image 486. In particular, in some cases, the font classification model 488 determines the classification metric 490 for the digital image 486 as a whole based on a combination of the text heights and text lengths of the text boxes depicted in the digital image 486. In one or more embodiments, the digital asset recommendation system 106 determines to use the classification metric 490 as the score value for the font asset 482 or the font theme asset 484 from that stage of the generation process. In one or more embodiments, the font classification model 488 identifies and analyzes the various texts as described in U.S. patent application Ser. No. 16/675,529 filed on Nov. 6, 2019, entitled DETECTING TYPOGRAPHY ELEMENTS FROM OUTLINES, which is incorporated herein by reference in its entirety.

As further shown in FIG. 4E, the digital asset recommendation system 106 utilizes a text extraction model 494 of the asset-recommendation-machine-learning model 400 to generate the font asset 482 from the digital image 486. For instance, in one or more embodiments, the text extraction model 494 generates the font asset 482 by determining a score for each font represented in the digital image 486 based on the text heights and text lengths of the text boxes associated with the font. The text extraction model 494 generates the font asset 482 using the font having the highest score (or one of the highest scores when generating multiple font assets). In some cases, the text extraction model 494 generates the font asset 482 by extracting the text associated with the font or by identifying the font style associated with the font and creating the font asset 482 using the font style. In one or more embodiments, the digital asset recommendation system 106 determines to use the score determined for the font as the score value for the font asset 482 at that stage of the generation process.

Additionally, as shown in FIG. 4E, the digital asset recommendation system 106 utilizes the text extraction model 494 to generate the font theme asset 484 from the digital image 486. For instance, in one or more embodiments, the text extraction model 494 generates the font theme asset 484 by scoring each font represented in the digital image 486 as discussed above. In some cases, the text extraction model 494 further identifies related fonts and groups them into a font theme. In some cases, the text extraction model 494 determines a score for each font theme based on the individual scores of the included fonts. The text extraction model 494 generates the font theme asset 484 using the font theme having the highest score (or one of the highest scores when generating multiple font theme assets). In one or more embodiments, the digital asset recommendation system 106 determines to use the score determined for the font theme as the score value for the font theme asset 484 at that stage of the generation process.

Thus, in one or more embodiments, the digital asset recommendation system 106 generates the font asset 482 or the font theme asset 484 using text depicted in the digital image 486. Further, in one or more embodiments, the digital asset recommendation system 106 determines an asset score for the font asset 482 or the font theme asset 484 based on the score values determined from the font classification model 488 and/or the text extraction model 494 (e.g., based on a combination of the scores values). In some instances, the digital asset recommendation system 106 normalizes or applies weights to the score values before combining them to determine the asset score. It should be noted that, while FIG. 4E shows the digital asset recommendation system 106 generating a font asset and a font theme asset from a digital image, the digital asset recommendation system 106 can generate one or the other in some embodiments.

Accordingly, the digital asset recommendation system 106 utilizes the asset-recommendation-machine-learning model 400 to generate various digital assets from digital images. Indeed, in some cases, the digital asset recommendation system 106 utilizes the asset-recommendation-machine-learning model to generate multiple digital assets from a single digital image. In one or more embodiments, the asset-recommendation-machine-learning model further determines an asset score for each digital asset generated from a digital image, ranks the digital assets based on their corresponding asset score, and uses the ranking to select one or more of the digital assets for provision to a client device via recommendations. In one or more embodiments, the digital asset recommendation system 106 normalizes or applies weights to the asset scores and ranks the digital assets based on the normalized/weighted scores.

The algorithm presented below represents another characterization of how the digital asset recommendation system 106 utilizes an asset-recommendation-machine-learning model to generate one or more digital assets from a digital image.

Algorithm

```
Begin
predictions = keras.applications.mobilenet.MobileNet( ).predict(input_image)
// [predictions = [['Shape', 0.70]], ['Color', 0.25], ['Pattern', 0.05]]]
ranking_queue<CCAsset, Rank>. // List maintains top ranked asset Type
forEachTopPrediction{ assetType →
    is shape?
      begin:
        detect_objects( ) → extract_objects( )→getRank( ) → vectorize_objects ( ) →
        ranking_queue.add(Vectorized Shape, Rank)
      end:
    is pattern?
      begin:
        detect_objects( ) →
          extract_objects( ) → forEach Object →
            begin:
              predictions = mobile.predict(Object) //Predict Tile Type
              [prediction_result = [[Tile1, 0.70], [Tile2, 0.25], [Tile3, 0.05]]]
              //Top Prediction Tile 1
              begin:
              generate_pattern(Object, Tile1) //Create pattern of object and tile
              type
```

-continued

| Algorithm |
|---|
| ```
            getRank( ) → ranking_queue.add(Generate_Pattern, Rank)
          end:
        end:
  is color?
    begin:
      background/foreground_segmentation( ) →
        is dominant foreground?
          extract_foreground( ) → getRank( ) →
            ranking_queue.add(create_colorThme_of_foreground( ), rank)
        is dominant background?
          extract_background( ) →
            create_gradient_of_background( ) → getRank( ) →
            ranking_queue.add(create_gradient_of_background( ), rank)
    end:
  is font?
    begin:
      OCR( ) → recognizeFontTypes( ) → getRank( ) → Generate Font Theme
    end:
  begin:
    rankingQueue.getTopRankedAssets( ) → Recommend/Create/Save Top CC Assets
  end:
End
``` |

As mentioned above, in one or more embodiments, the digital asset recommendation system 106 implements one or more thresholds for determining whether to move forward with generating a particular digital asset or digital assets of a particular digital asset class. For instance, in some cases, the digital asset recommendation system 106 implements a threshold at each stage of the generation process. To illustrate, in some embodiments, the digital asset recommendation system 106 implements a threshold at the classification metric generator stage, the pre-asset network stage, and/or the asset-configuration-neural network stage. In some instance, upon determining that a value (e.g., a score value) for a digital asset fails to satisfy a corresponding threshold, the digital asset recommendation system 106 determines to terminate generation of the digital asset. The thresholds used can be the same or different for digital assets of different digital asset types. To provide one example, in one or more embodiments, the digital asset recommendation system 106 determines to move forward with generating a digital asset of a particular digital asset class only if the classification metric returned for that digital asset class exceeds 0.50 (e.g., indicating that it is more likely than not that the digital image can be used to generate a digital asset of that digital asset class).

Further, in one or more embodiments, various portions of the generation process implemented by the digital asset recommendation system 106 are configurable. Indeed, in some embodiments, the digital asset recommendation system 106 modifies various portions of the generation process based on user input. For instance, the digital asset recommendation system 106 can configure, based on user input, one or more of the thresholds implemented, the number of digital assets selected for recommendation, the number of digital assets of a particular digital asset class considered for recommendation, or other aspects of the digital assets that are generated (e.g., the number of colors used in a color palette asset).

Thus, the digital asset recommendation system 106 provides an unconventional approach that utilizes machine learning to generate digital assets from digital images. Indeed, the digital asset recommendation system 106 implements an unconventional ordered combination of actions by incorporating various computer-implemented models within a machine learning framework (e.g., an asset-recommendation-machine-learning model) that analyzes a digital image and generates one or more digital assets based on the analysis. Thus, the digital asset recommendation system 106 utilizes machine learning to provide a client device with recommendations production-ready, pre-generated digital assets.

By incorporating the machine learning framework to generate digital assets from digital images, the digital asset recommendation system 106 further offers improved efficiency when compared to conventional systems. In particular, the digital asset recommendation system 106 requires fewer user interactions with a graphical user interface to generate production-ready digital assets from a digital image. Indeed, as discussed above, the digital asset recommendation system 106 utilizes the machine learning framework to provide one or more recommended digital assets for display on a client device, allowing a user to view pre-generated digital assets after uploading or selecting a digital image. Thus, the digital asset recommendation system 106 allows the client device to store the recommended digital assets without requiring the user interactions that are typically required under conventional systems to generate the digital assets.

Figure 5:
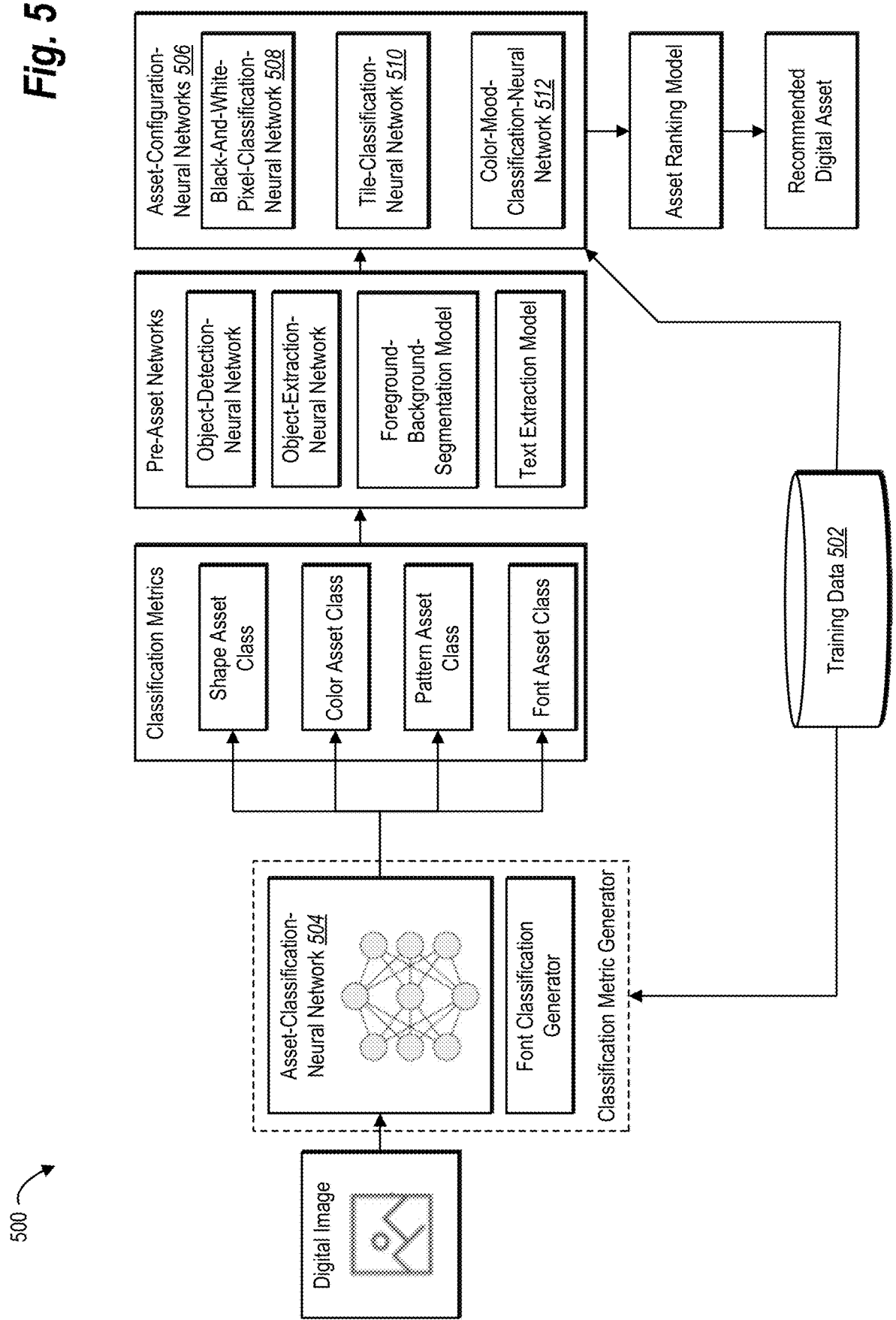
FIG. 5 illustrates a diagram for training an asset-recommendation-machine-learning model in accordance with one or more embodiments.

In one or more embodiments, the digital asset recommendation system 106 generates (e.g., trains or otherwise learns parameters for) an asset-recommendation-machine-learning model to generate digital assets from digital images. In particular, the digital asset recommendation system 106 trains various components of the asset-recommendation-machine-learning model. FIG. 5 illustrates a diagram for training an asset-recommendation-machine-learning model in accordance with one or more embodiments.

As shown in FIG. 5, the digital asset recommendation system 106 utilizes training data 502 to generate an asset-recommendation-machine-learning model 500. In particular, the digital asset recommendation system 106 utilizes the training data 502 to train an asset-classification-neural network 504 and asset-configuration-neural networks 506 of the asset-recommendation-machine-learning model 500.

In one or more embodiments, the training data 502 includes digital images previously utilized by users to generate at least one digital asset. In some cases, the training data 502 further includes the digital assets that were generated from those digital images and the parameters used for those digital assets. In some implementations, the training data 502 further includes various mappings that map the digital images to the digital assets and/or their corresponding parameters. For instance, in some cases, the training data 502 includes a user-tagged dataset from Adobe Capture Service that includes digital images, resulting digital assets, and parameters used for those digital assets as annotated by the users manually creating the digital assets.

In one or more embodiments, the digital asset recommendation system 106 trains the asset-classification-neural network 504 and the asset-configuration-neural networks 506 utilizing the training data 502. In particular, the digital asset recommendation system 106 determines the weights to use for the asset-classification-neural network 504 and the asset-configuration-neural networks 506 using the training data 502. For instance, in one or more embodiments, the digital asset recommendation system 106 trains the asset-classification-neural network 504 and the asset-configuration-neural networks 506 by adjusting their weights to correctly classify a digital image or generate a corresponding digital asset, respectively, based on the training data 502.

To illustrate, in one or more embodiments, the training data 502 includes one or more mappings that map digital images to digital asset classes. Indeed, the one or more mappings can indicate which digital images were used to create digital assets of a given digital asset class. Thus, in one or more embodiments, the digital asset recommendation system 106 trains the asset-classification-neural network 504 using these mappings.

As another example, in some cases, the training data 502 includes one or more mappings that map digital images used to create shape assets to threshold values used for converting digital objects from the digital images to black-and-white (or grayscale). Indeed, the one or more mappings can indicate which threshold value was used for a given digital image (or for a given digital object portrayed in a digital image). Thus, in one or more embodiments, the digital asset recommendation system 106 trains a black-and-white-pixel-classification-neural network 508 of the asset-configuration-neural networks 506 using these mappings.

Additionally, in one or more embodiments, the training data 502 includes one or more mappings that map digital images used to create pattern assets to tile arrangements used for creating patterns from the digital images. Indeed, the one or more mappings can indicate which tile arrangement was used for a given digital image (or for a given digital object portrayed in a digital image). Thus, in one or more embodiments, the digital asset recommendation system 106 trains a tile-classification-neural network 510 of the asset-configuration-neural networks 506 using these mappings.

Further, in one or more embodiments, the training data includes one or more mappings that map digital images used to create color palette assets to color moods used for creating color palettes from the digital images. Indeed, the one or more mappings can indicate which color mood was selected for creating a color palette from a given digital image. Thus, in one or more embodiments, the digital asset recommendation system 106 trains a color-mood-classification-neural network 512 of the asset-configuration-neural networks 506 using these mappings.

In one or more embodiments, the digital asset recommendation system 106 trains the asset-classification-neural network 504 and the asset-configuration-neural networks 506 via transfer learning. Indeed, in one or more embodiments, the digital asset recommendation system 106 leverages one or more pre-trained neural networks (e.g., trained on a different domain or set of training data) to learn parameters for implementation via the asset-recommendation-machine-learning model 500. Thus, the digital asset recommendation system 106 can more efficiently train the asset-classification-neural network 504 and the asset-configuration-neural networks 506 for use in generating digital assets from digital images.

Figure 6:
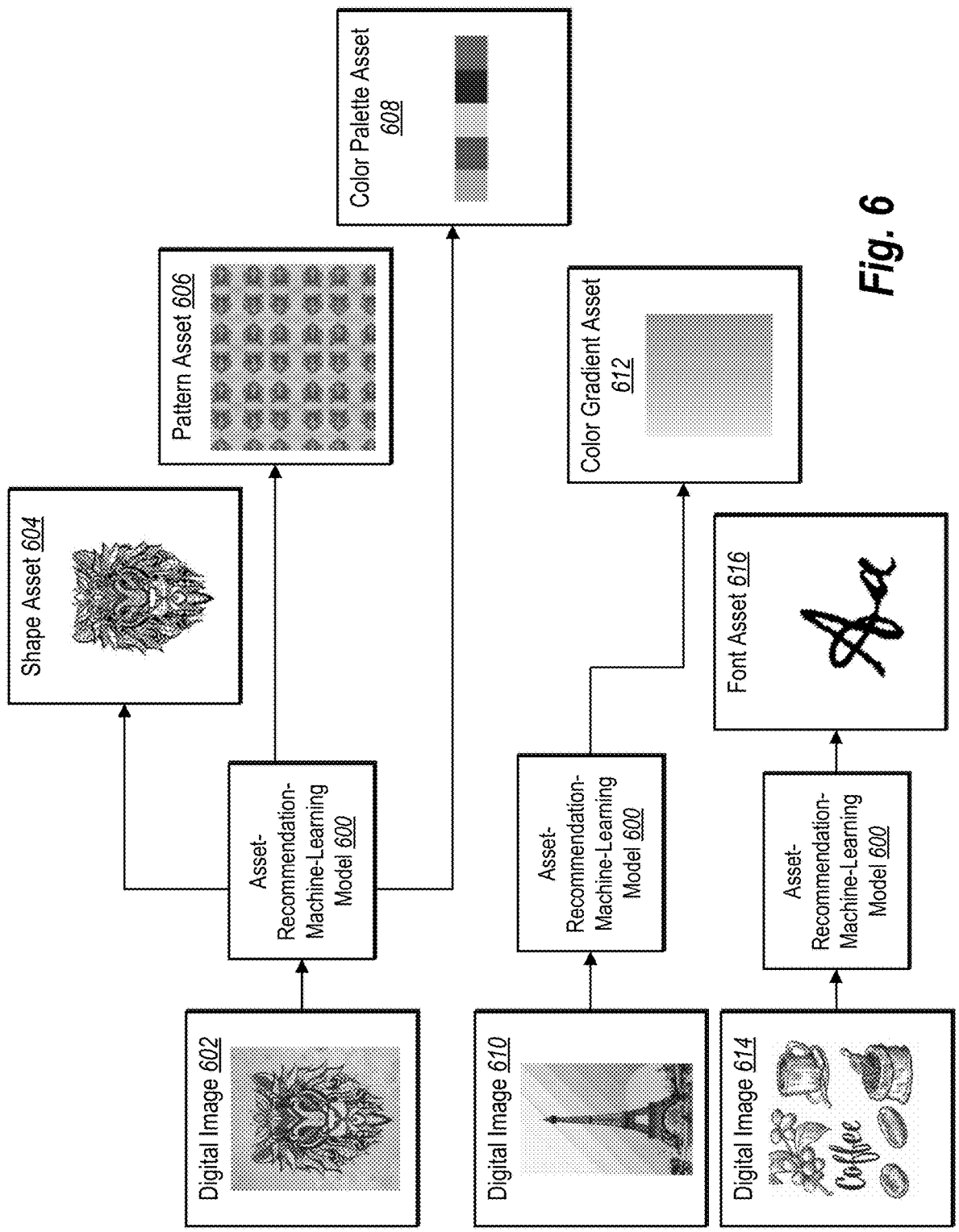
FIG. 6 illustrates example digital assets generated from various digital images in accordance with one or more embodiments.

FIG. 6 illustrates example digital assets generated from various digital images using an asset-recommendation-machine-learning model in accordance with one or more embodiments. For example, as shown in FIG. 6, the digital asset recommendation system 106 passes a digital image 602 through an asset-recommendation-machine-learning model 600 to generate a shape asset 604, a pattern asset 606, and a color palette asset 608. In particular, the digital asset recommendation system 106 analyzes the digital object (e.g., the lion) depicted in the digital image 602 using the asset-recommendation-machine-learning model 600 to generate the shape asset 604, the pattern asset 606, and the color palette asset 608.

Additionally, as shown, the digital asset recommendation system 106 passes a digital image 610 through the asset-recommendation-machine-learning model 600 to generate a color gradient asset 612. In particular, the digital asset recommendation system 106 analyzes the background portrayed in the digital image 610 using the asset-recommendation-machine-learning model 600 to generate the color gradient asset 612.

Further, the digital asset recommendation system 106 passes a digital image 614 through the asset-recommendation-machine-learning model 600 to generate a font asset 616. In particular, the digital asset recommendation system 106 analyzes the text depicted in the digital image 614 using the asset-recommendation-machine-learning model 600 to generate the font asset 616. In one or more embodiments, the digital asset recommendation system 106 similarly generates a font theme asset (not shown) from the digital image 614. In some cases, the digital asset recommendation system 106 passes a digital image depicting multiple different fonts through using the asset-recommendation-machine-learning model 600 to generate a font theme asset.

Thus, as indicated by FIG. 6, the digital asset recommendation system 106 can generate various numbers of digital assets from digital images using the asset-recommendation-machine-learning model 600. Further, the digital asset recommendation system 106 can generate digital assets of various types from a single digital image. Indeed, the digital asset recommendation system 106 provides efficient digital asset generation by generating one or more digital assets from a digital asset without receiving user interactions for generating those digital assets.

In one or more embodiments, rather than directly generating a digital asset from a digital image, the digital asset recommendation system 106 provides one or more interactive elements (e.g., for display on a graphical user interface) for manually generating a digital asset. To illustrate, in one or more embodiments, the digital asset recommendation system 106 identifies a digital image, such as a digital image that has been uploaded to or otherwise accessed by the implementing computing device. Further, the digital asset recommendation system 106 determines that a digital asset class is associated with the digital image (e.g., using an asset-classification-neural network of an asset-recommendation-machine-learning model).

In response, to identifying the digital asset class, the digital asset recommendation system 106 provides one or more interactive elements that can be used for manually generating a digital asset associated with that digital asset class from the digital image. As one example, the digital asset recommendation system 106 can provide one or more interactive elements for creating a color palette asset from a digital image, such as interactive elements for selecting a color mood, manually selecting individual colors, or for modifying the brightness or RGB values of each color. Thus, the digital asset recommendation system 106 can efficiently direct a computing device to a module having tools for generating a digital asset of a given digital asset class upon detecting that such a digital asset class is associated with a digital image.

Figure 7:
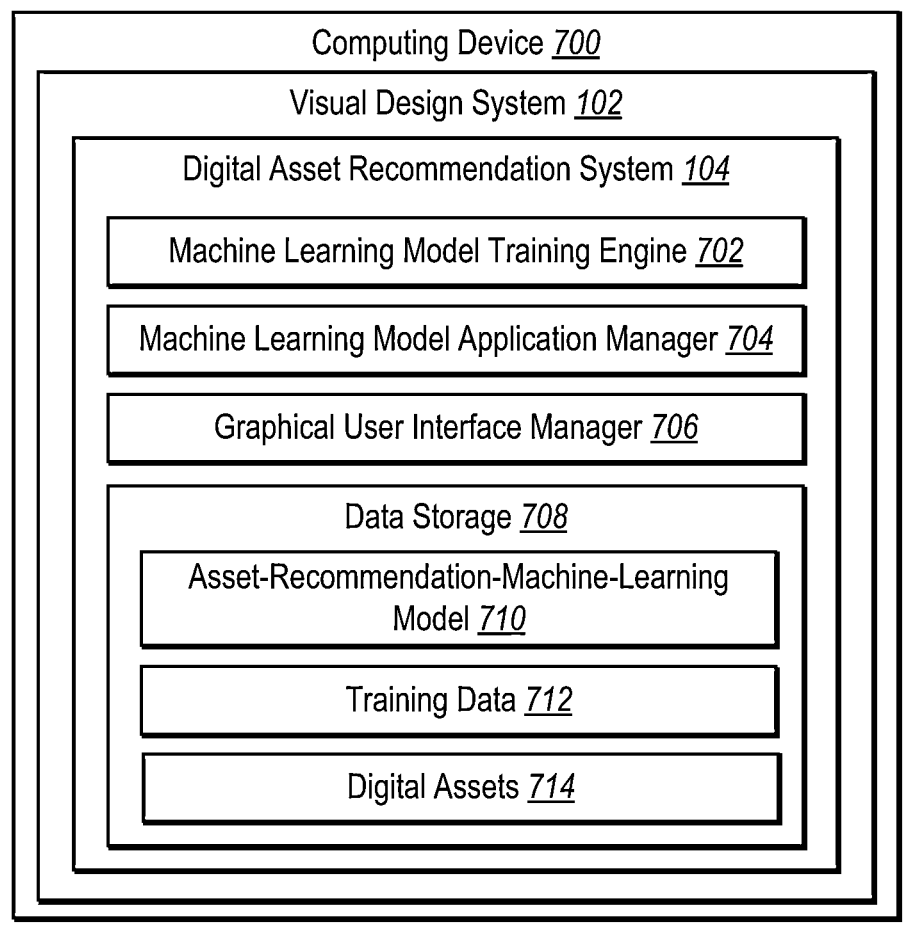
FIG. 7 illustrates an example schematic diagram of a digital asset recommendation system in accordance with one or more embodiments.

Turning to FIG. 7, additional detail will now be provided regarding various components and capabilities of the digital asset recommendation system 106. In particular, FIG. 7 illustrates the digital asset recommendation system 106 implemented by a computing device 700 (e.g., the server(s) 102 and/or one of the client devices 110a-110n discussed above with reference to FIG. 1). Additionally, the digital asset recommendation system 106 is also part of the visual design system 104. As shown, in one or more embodiments, the digital asset recommendation system 106 includes, but is not limited to, a machine learning model training engine 702, a machine learning model application manager 704, a graphical user interface manager 706, and data storage 708 (which includes an asset-recommendation-machine-learning model 710, training data 712, and digital assets 714).

As just mentioned, and as illustrated in FIG. 7, the digital asset recommendation system 106 includes the machine learning model training engine 702. In one or more embodiments, the machine learning model training engine 702 trains an asset-recommendation-machine-learning model to generate digital assets from digital images and provide some of the digital assets for recommendation. In particular, in some cases, the machine learning model training engine 702 trains an asset-classification-neural network and asset-configuration-neural networks of the asset-recommendation-machine-learning model. For instance, in some implementations, the machine learning model training engine 702 utilizes training data to determine weights for the asset-classification-neural network and the asset-configuration-neural networks.

Further, as shown in FIG. 7, the digital asset recommendation system 106 includes the machine learning model application manager 704. In one or more embodiments, the machine learning model application manager 704 utilizes the asset-recommendation-machine-learning model trained by the machine learning model training engine 702 to generate digital assets from digital images. For instance, in some cases, the machine learning model application manager 704 utilizes the asset-recommendation-machine-learning model to analyze a digital image, determine one or more digital asset classes associated with the digital image, generate preprocessed digital assets corresponding to those digital asset classes, and generate digital assets from the preprocessed digital assts. In some cases, the machine learning model application manager 704 further utilizes the asset-recommendation-machine-learning model to select one or more of the generated digital assets to determine a set of recommended digital assets.

Additionally, as shown in FIG. 7, the digital asset recommendation system 106 includes the graphical user interface manager 706. In one or more embodiments, the graphical user interface manager 706 provides recommended digital assets for display within a graphical user interface. In some cases, the graphical user interface manager 706 further detects user interactions for selecting and/or storing one or more of the recommended digital assets. In some implementations, the graphical user interface manager 706 detects one or more user interactions for modifying one of the recommended digital assets and provides interactive elements for modifying the selected recommended digital asset in response.

As shown in FIG. 7, the digital asset recommendation system 106 further includes data storage 708. In particular, data storage 708 includes the asset-recommendation-machine-learning model 710, training data 712, and digital assets 714. In one or more embodiments, the asset-recommendation-machine-learning model 710 stores the asset-recommendation-machine-learning model trained by the machine learning model training engine 702 and implemented by the machine learning model application manager 704 to generate and recommend digital assets from digital images. In one or more embodiments, training data 712 stores the training data (e.g., the training digital images and mappings between the training digital images and generated digital assets) utilized by the machine learning model training engine 702 to train an asset-recommendation-machine-learning model. Further, in some embodiments, the digital assets 714 stores digital assets. For example, the digital assets 714 stores digital assets manually created by a user and/or digital assets generated from digital images using an asset-recommendation-machine-learning model.

Each of the components 702-714 of the digital asset recommendation system 106 can include software, hardware, or both. For example, the components 702-714 can include one or more instructions stored on a computer-readable storage medium and executable by processors of one or more computing devices, such as a client device or server device. When executed by the one or more processors, the computer-executable instructions of the digital asset recommendation system 106 can cause the computing device(s) to perform the methods described herein. Alternatively, the components 702-714 can include hardware, such as a special-purpose processing device to perform a certain function or group of functions. Alternatively, the components 702-714 of the digital asset recommendation system 106 can include a combination of computer-executable instructions and hardware.

Furthermore, the components 702-714 of the digital asset recommendation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-714 of the digital asset recommendation system 106 may be implemented as a stand-alone application, such as a desktop or mobile application. Furthermore, the components 702-714 of the digital asset recommendation system 106 may be implemented as one or more web-based applications hosted on a remote server. Alternatively, or additionally, the components 702-714 of the digital asset recommendation system 106 may be implemented in a suite of mobile device applications or "apps." For example, in one or more embodiments, the digital asset recommendation system 106 can comprise or operate in connection with digital software applications such as ADOBE® CAPTURE, ADOBE® ILLUSTRATOR®, or ADOBE® PHOTO- SHOP®. The foregoing are either registered trademarks or trademarks of Adobe Inc. in the United States and/or other countries.

Figure 8:
FIG. 8 illustrates a flowchart of a series of acts for generating a digital asset for recommendation from a digital image in accordance with one or more embodiments.
Figure 8:
Figure 8:

FIGS. 1-7, the corresponding text, and the examples provide a number of different methods, systems, devices, and non-transitory computer-readable media of the digital asset recommendation system 106. In addition to the foregoing, one or more embodiments can also be described in terms of flowcharts comprising acts for accomplishing the particular result, as shown in FIG. 8. FIG. 8 may be performed with more or fewer acts. Further, the acts may be performed in different orders. Additionally, the acts described herein may be repeated or performed in parallel with one another or in parallel with different instances of the same or similar acts.

FIG. 8 illustrates a flowchart of a series of acts 800 for generating a digital asset for recommendation from a digital image in accordance with one or more embodiments. While FIG. 8 illustrates acts according to one embodiment, alternative embodiments may omit, add to, reorder, and/or modify any of the acts shown in FIG. 8. In some implementations, the acts of FIG. 8 are performed as part of a method. For example, in some embodiments, the acts of FIG. 8 are performed, in a digital medium environment for digital design, as part of a computer-implemented method for generating recommended digital assets. Alternatively, a non-transitory computer-readable medium can store instructions thereon that, when executed by at least one processor, cause a computing device to perform the acts of FIG. 8. In some embodiments, a system performs the acts of FIG. 8. For example, in one or more embodiments, a system includes at least one memory device comprising an asset-recommendation-machine-learning model comprising an asset-classification-neural network, a set of pre-asset networks, and a set of asset-configuration-neural networks. The system further includes at least one server device configured to cause the system to perform the acts of FIG. 8.

The series of acts 800 includes an act 802 of determining a digital asset class associated with a digital image. For instance, in one or more embodiments, the act 802 involves determining, utilizing an asset-recommendation-machine-learning model, a digital asset class associated with a digital image from among a set of different digital asset classes. In some embodiments, determining the digital asset class from among the set of different digital asset classes comprises determining one of a shape asset class, a color asset class, a pattern asset class, or a font asset class.

The series of acts 800 also includes an act 804 of generating a digital asset corresponding to the digital asset class. To illustrate, in one or more embodiments, the act 804 involves generating, from the digital image and utilizing the asset-recommendation-machine-learning model, a digital asset corresponding to the digital asset class. In some embodiments, generating the digital asset corresponding to the digital asset class comprises generating a shape asset corresponding to the shape asset class, a color palette asset corresponding to the color asset class, a color gradient asset corresponding to the color asset class, a pattern asset corresponding to the pattern asset class, a font asset corresponding to the font asset class, or a font theme asset corresponding to the font asset class.

In one or more embodiments, the digital asset recommendation system 106 further generates, from the digital image and utilizing the asset-recommendation-machine-learning model, a preprocessed shape asset corresponding to a shape asset class or a pattern asset class by: detecting a digital object portrayed in the digital image utilizing an object-detection-neural network; and extracting the digital object from the digital image utilizing an object-extraction-neural network. Accordingly, in some embodiments, generating the digital asset corresponding to the digital asset class comprises generating a shape asset corresponding to a shape asset class from the preprocessed shape asset utilizing a black-and-white-pixel-classification-neural network. Further, in some embodiments, generating the digital asset corresponding to the digital asset class comprises generating a pattern asset corresponding to a pattern asset class from the preprocessed shape asset utilizing a tile-classification-neural network.

In some implementations, the digital asset recommendation system 106 further generates, from the digital image and utilizing the asset-recommendation-machine-learning model, a preprocessed color asset corresponding to a color asset class by extracting a foreground image layer from the digital image utilizing a foreground-background-segmentation model. Accordingly, in some embodiments, generating the digital asset corresponding to the digital asset class comprises generating, utilizing a color-mood-classification-neural network, a color palette asset corresponding to the color asset class based on the preprocessed color asset.

Similarly, in some cases, the digital asset recommendation system 106 further generates, from the digital image and utilizing the asset-recommendation-machine-learning model, a preprocessed color asset corresponding to a color asset class by extracting a background image layer from the digital image utilizing a foreground-background-segmentation model. Accordingly, in some instances, generating the digital asset corresponding to the digital asset class comprises generating a color gradient asset corresponding to the color asset class based on the preprocessed color asset.

Further, the series of acts 800 includes an act 806 of generating a recommended digital asset from the digital asset. For example, in some embodiments, the act 806 involves generating, from the digital asset, a recommended digital asset associated with the digital asset class. In one or more embodiments, generating, from the digital asset, the recommended digital asset associated with the digital asset class comprises: generating an asset score for the digital asset; and generating the recommended digital asset from the digital asset based on comparing the asset score for the digital asset with one or more additional asset scores for one or more additional digital assets.

In one or more embodiments, the series of acts 800 further includes acts for generating multiple digital assets from a digital image. For example, in some cases, the acts include determining, utilizing the asset-recommendation-machine-learning model, an additional digital asset class associated with the digital image from among the set of different digital asset classes; generating, from the digital image and utilizing the asset-recommendation-machine-learning model, an additional digital asset corresponding to the digital asset class; and generating, from the digital asset and for display with the recommended digital asset within a graphical user interface, an additional recommended digital asset associated with the additional digital asset class.

To provide an illustration, in one or more embodiments, the digital asset recommendation system 106 determines, utilizing an asset-classification-neural network of an asset-recommendation-machine-learning model, a set of digital asset classes associated with a digital image; generates, from the digital image and utilizing one or more pre-asset networks of the asset-recommendation-machine-learning model, a set of preprocessed digital assets corresponding to the set of digital asset classes; generates, utilizing an assetconfiguration-neural network of the asset-recommendation-machine-learning model, a set of digital assets from the set of preprocessed digital assets; and determines, from the set of digital assets, a set of recommended digital assets associated with different digital asset classes.

In one or more embodiments, the digital asset recommendation system 106 determines, utilizing the asset-classification-neural network of the asset-recommendation-machine-learning model, the set of digital asset classes associated with the digital image by generating a first classification metric for a shape asset class, a second classification metric for a color asset class, and a third classification metric for a pattern asset class. In some cases, the digital asset recommendation system 106 further determines the set of digital asset classes associated with the digital image by: determining a text height and text length of one or more text blocks of the digital image; and generating a classification metric for a font asset class based on the text height and text length of the one or more text blocks.

In some embodiments, the digital asset recommendation system 106 further detects one or more user interactions with a graphical user interface displayed on a client device for creating a digital asset from the digital image; and provides, for display within the graphical user interface, the set of recommended digital assets with the digital asset in response to the one or more user interactions. In some embodiments, the digital asset recommendation system 106 determines, from the set of digital assets, a set of recommended digital assets associated with the different digital asset classes by determining a first set of recommended digital assets for the digital image, the first set of recommended digital assets associated with a first set of digital asset classes; and determines, for an additional digital image, additional recommended digital assets associated with a second set of digital asset classes comprising at least one digital asset class not included within the first set of digital asset classes. In some cases, the digital asset recommendation system 106 further determines, utilizing the asset-recommendation-machine-learning model, a digital asset class associated with an additional digital image; and provides, for display within a graphic user interface of a client device, one or more interactive elements for generating a digital asset associated with the digital asset class from the additional digital image.

To provide another example, in one or more embodiments, the digital asset recommendation system 106 determines, utilizing an asset-classification-neural network, a set of digital asset classes associated with a digital image; generates, from the digital image and utilizing at least one pre-asset network from a set of pre-asset networks, a set of preprocessed digital assets corresponding to the set of digital asset classes; generates, utilizing at least one asset-configuration-neural network from a set of asset-configuration-neural networks, a set of digital assets from the set of preprocessed digital assets; determines an asset score for each digital asset from the set of digital assets; and generates, from the set of digital assets, a set of recommended digital assets by selecting digital assets associated with different digital asset classes based on the asset score for each digital asset.

In one or more embodiments, the digital asset recommendation system 106 determines the asset score for each digital asset from the set of digital assets by determining a score value for each digital asset utilizing at least one of the asset-classification-neural network, the at least one pre-asset network, or the at least one asset-configuration-neural network. In some cases, the digital asset recommendation system 106 determines a font asset class associated with the digital image based on text heights and text lengths of text boxes portrayed in the digital image; and generates, from the digital image, at least one font asset based on a text height and text length of a text box comprising a corresponding font utilizing a text extraction model.

In one or more embodiments, the digital asset recommendation system 106 generates, from the digital image and utilizing the at least one pre-asset network, the set of preprocessed digital assets corresponding to the set of digital asset classes by extracting a digital object from the digital image utilizing the at least one pre-asset network; and generates, utilizing the at least one asset-configuration-neural network from the set of asset-configuration-neural networks, a set of digital assets from the set of preprocessed digital assets by generating, utilizing the at least one asset-configuration-neural network, one of a shape asset corresponding to a shape asset class or a color palette asset corresponding to a color asset class based on the digital object. In some cases, the digital asset recommendation system 106 generates, from the digital image and utilizing the at least one pre-asset network, the set of preprocessed digital assets corresponding to the set of digital asset classes by extracting a foreground image layer and a background image layer from the digital image utilizing the at least one pre-asset network; and generates, utilizing the at least one asset-configuration-neural network from the set of asset-configuration-neural networks, the set of digital assets from the set of preprocessed digital assets by: generating a color palette asset corresponding to a color asset class using the foreground image layer; and generating a color gradient asset corresponding to the color asset class using the background image layer.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
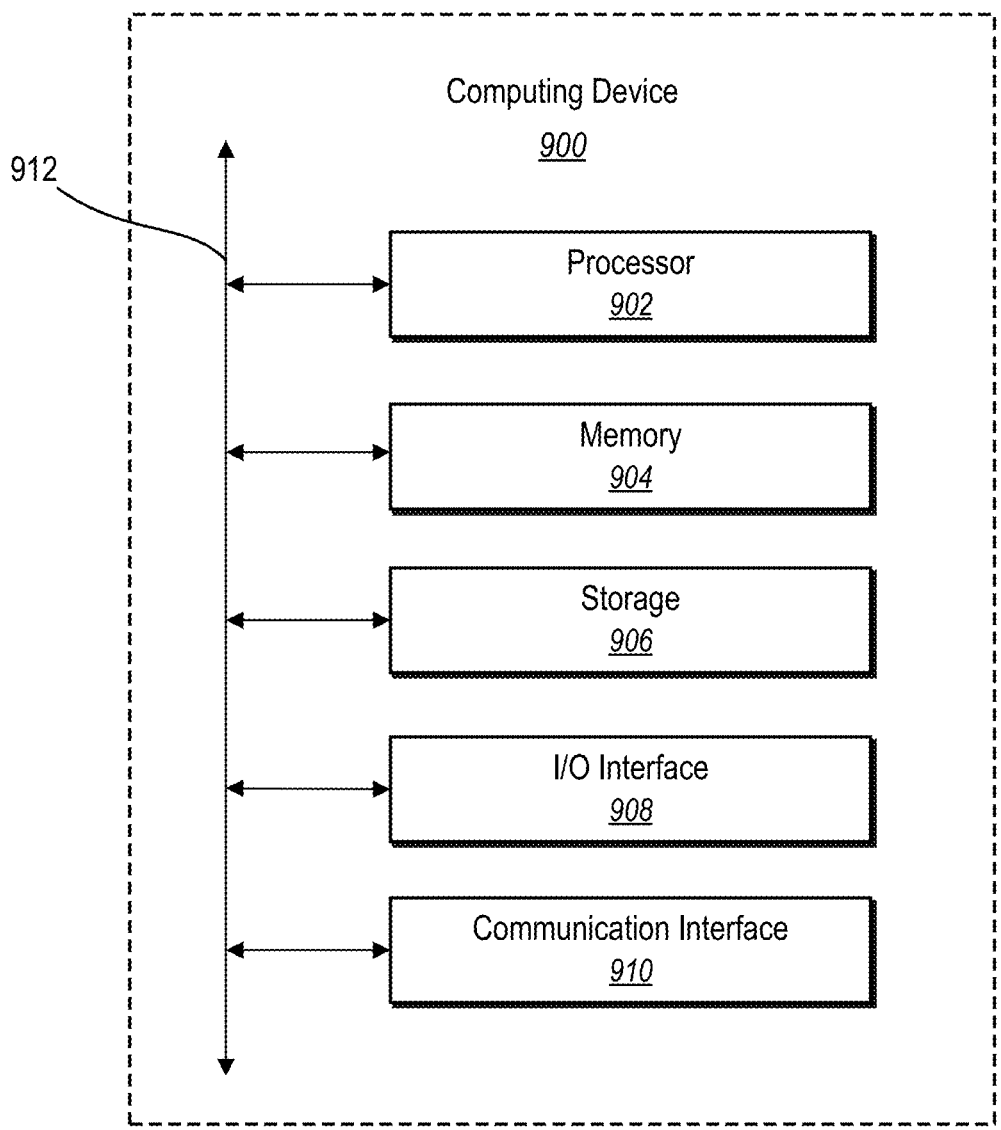
FIG. 9 illustrates a block diagram of an exemplary computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 102 and/or the client devices 110a-110n). In one or more embodiments, the computing device 900 may be a mobile device (e.g., a mobile telephone, a smartphone, a PDA, a tablet, a laptop, a camera, a tracker, a watch, a wearable device). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 including storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
    generating, from a digital image, a set of classification metrics for a set of different digital asset classes;
    determining, utilizing the set of classification metrics, a digital asset class associated with the digital image from among the set of different digital asset classes;
    generating, from the digital image and utilizing an asset-recommendation-machine-learning model, a digital asset corresponding to the digital asset class; and
    generating, from the digital asset, a recommended digital asset associated with the digital asset class.

2. The computer-implemented method of claim 1, wherein:
    determining the digital asset class from among the set of different digital asset classes comprises determining one of a shape asset class, a color asset class, a pattern asset class, or a font asset class; and
    generating the digital asset corresponding to the digital asset class comprises generating a shape asset corresponding to the shape asset class, a color palette asset corresponding to the color asset class, a color gradient asset corresponding to the color asset class, a pattern asset corresponding to the pattern asset class, a font asset corresponding to the font asset class, or a font theme asset corresponding to the font asset class.

3. The computer-implemented method of claim 1, further comprising generating, from the digital image and utilizing the asset-recommendation-machine-learning model, a preprocessed shape asset corresponding to a shape asset class or a pattern asset class by:
    detecting a digital object portrayed in the digital image utilizing an object-detection-neural network; and
    extracting the digital object from the digital image utilizing an object-extraction-neural network.

4. The computer-implemented method of claim 3, wherein generating the digital asset corresponding to the digital asset class comprises generating a shape asset corresponding to a shape asset class from the preprocessed shape asset utilizing a black-and-white-pixel-classification-neural network.

5. The computer-implemented method of claim 3, wherein generating the digital asset corresponding to the digital asset class comprises generating a pattern asset corresponding to a pattern asset class from the preprocessed shape asset utilizing a tile-classification-neural network.

6. The computer-implemented method of claim 1,
    further comprising generating, from the digital image and utilizing the asset-recommendation-machine-learning model, a preprocessed color asset corresponding to a color asset class by extracting a foreground image layer from the digital image utilizing a foreground-background-segmentation model,
    wherein generating the digital asset corresponding to the digital asset class comprises generating, utilizing a color-mood-classification-neural network, a color palette asset corresponding to the color asset class based on the preprocessed color asset.

7. The computer-implemented method of claim 1,
    further comprising generating, from the digital image and utilizing the asset-recommendation-machine-learning model, a preprocessed color asset corresponding to a color asset class by extracting a background image layer from the digital image utilizing a foreground-background-segmentation model, wherein generating the digital asset corresponding to the digital asset class comprises generating a color gradient asset corresponding to the color asset class based on the preprocessed color asset.

8. The computer-implemented method of claim 1, wherein generating, from the digital asset, the recommended digital asset associated with the digital asset class comprises:
generating an asset score for the digital asset; and
generating the recommended digital asset from the digital asset based on comparing the asset score for the digital asset with one or more additional asset scores for one or more additional digital assets.

9. The computer-implemented method of claim 1, further comprising:
determining, utilizing the asset-recommendation-machine-learning model, an additional digital asset class associated with the digital image from among the set of different digital asset classes;
generating, from the digital image and utilizing the asset-recommendation-machine-learning model, an additional digital asset corresponding to the digital asset class; and
generating, from the digital asset and for display with the recommended digital asset within a graphical user interface, an additional recommended digital asset associated with the additional digital asset class.

10. A non-transitory computer-readable medium storing instructions thereon that, when executed by at least one processor, cause the at least one processor to perform operations comprising:
generating, from a digital image utilizing an asset-classification-neural network of an asset-recommendation-machine-learning model, a plurality of classification metrics for a plurality of digital asset classes;
determining, utilizing the plurality of classification metrics and the asset-classification-neural network, a set of digital asset classes associated with the digital image from among the plurality of digital asset classes;
generating, from the digital image and utilizing one or more pre-asset networks of the asset-recommendation-machine-learning model, a set of preprocessed digital assets corresponding to the set of digital asset classes;
generating, utilizing an asset-configuration-neural network of the asset-recommendation-machine-learning model, a set of digital assets from the set of preprocessed digital assets; and
determining, from the set of digital assets, a set of recommended digital assets associated with different digital asset classes.

11. The non-transitory computer-readable medium of claim 10, wherein generating the plurality of classification metrics for the plurality of digital asset classes comprises generating a first classification metric for a shape asset class, a second classification metric for a color asset class, and a third classification metric for a pattern asset class.

12. The non-transitory computer-readable medium of claim 10, wherein generating the plurality of classification metrics for the plurality of digital asset classes comprises:
determining a text height and text length of one or more text blocks of the digital image; and
generating a classification metric for a font asset class based on the text height and text length of the one or more text blocks.

13. The non-transitory computer-readable medium of claim 10, wherein the operations further comprise:
detecting one or more user interactions with a graphical user interface displayed on a client device for creating a digital asset from the digital image; and
providing, for display within the graphical user interface, the set of recommended digital assets with the digital asset in response to the one or more user interactions.

14. The non-transitory computer-readable medium of claim 10, wherein:
determining, from the set of digital assets, the set of recommended digital assets associated with the different digital asset classes comprises determining a first set of recommended digital assets for the digital image, the first set of recommended digital assets associated with a first set of digital asset classes; and
the operations further comprise determining, for an additional digital image, additional recommended digital assets associated with a second set of digital asset classes comprising at least one digital asset class not included within the first set of digital asset classes.

15. The non-transitory computer-readable medium of claim 10, wherein the operations further comprise:
determining, utilizing the asset-recommendation-machine-learning model, a digital asset class associated with an additional digital image; and
providing, for display within a graphic user interface of a client device, one or more interactive elements for generating a digital asset associated with the digital asset class from the additional digital image.

16. A system comprising:
at least one memory device; and
at least one processor coupled to the at least one memory device that causes the system to perform operations comprising:
generating, from a digital image utilizing an asset-classification-neural network of an asset-recommendation-machine-learning model, a plurality of classification metrics for a plurality of digital asset classes;
determining, utilizing the plurality of classification metrics and the asset-classification-neural network, a set of digital asset classes associated with the digital image from among the plurality of digital asset classes;
generating, from the digital image and utilizing at least one pre-asset network of the asset-recommendation-machine-learning model, a set of preprocessed digital assets corresponding to the set of digital asset classes;
generating, utilizing at least one asset-configuration-neural network of the asset-recommendation-machine-learning model, a set of digital assets from the set of preprocessed digital assets;
determining an asset score for each digital asset from the set of digital assets; and
generating, from the set of digital assets, a set of recommended digital assets by selecting digital assets associated with different digital asset classes based on the asset score for each digital asset.

17. The system of claim 16, wherein determining the asset score for each digital asset from the set of digital assets comprises determining a score value for each digital asset utilizing at least one of the asset-classification-neural network, the at least one pre-asset network, or the at least one asset-configuration-neural network.

18. The system of claim 16, wherein:
determining the set of digital asset classes associated with the digital image comprises determining a font asset class associated with the digital image based on text heights and text lengths of text boxes portrayed in the digital image; and generating the set of digital assets comprises generating at least one font asset corresponding to the font asset class based on a text height and text length of a text box comprising a corresponding font utilizing a text extraction model.

19. The system of claim 16, wherein:

generating, from the digital image and utilizing the at least one pre-asset network, the set of preprocessed digital assets corresponding to the set of digital asset classes comprises extracting a digital object from the digital image utilizing the at least one pre-asset network; and generating, utilizing the at least one asset-configuration-neural network, the set of digital assets from the set of preprocessed digital assets comprises generating, utilizing the at least one asset-configuration-neural network, one of a shape asset corresponding to a shape asset class or a color palette asset corresponding to a color asset class based on the digital object.

20. The system of claim 16, wherein:

generating, from the digital image and utilizing the at least one pre-asset network, the set of preprocessed digital assets corresponding to the set of digital asset classes comprises extracting a foreground image layer and a background image layer from the digital image utilizing the at least one pre-asset network; and generating, utilizing the at least one asset-configuration-neural network, the set of digital assets from the set of preprocessed digital assets comprises:

generating a color palette asset corresponding to a color asset class using the foreground image layer; and generating a color gradient asset corresponding to the color asset class using the background image layer.

* * * * *